(12) United States Patent
Newcombe et al.

(10) Patent No.: US 9,830,407 B2
(45) Date of Patent: Nov. 28, 2017

(54) DATA CENTRE SIMULATOR

(75) Inventors: Liam Newcombe, Croydon (GB); Zahl Limbuwala, Twickenham (GB)

(73) Assignee: Romonet Limited (GB)

( * ) Notice: Subject to any disclaimer, the term of this patent is extended or adjusted under 35 U.S.C. 154(b) by 1219 days.

(21) Appl. No.: 12/505,464

(22) Filed: Jul. 17, 2009

(65) Prior Publication Data

US 2010/0292976 A1 Nov. 18, 2010

(30) Foreign Application Priority Data

May 18, 2009 (GB) .................................. 0908514.3

(51) Int. Cl.
*G06F 17/50* (2006.01)
*G06G 7/62* (2006.01)
*G06G 7/54* (2006.01)

(52) U.S. Cl.
CPC ...... *G06F 17/5009* (2013.01); *G06F 17/5004* (2013.01); *G06F 2217/78* (2013.01); *G06F 2217/80* (2013.01)

(58) Field of Classification Search
USPC ...................................................... 703/13, 18
See application file for complete search history.

(56) References Cited

U.S. PATENT DOCUMENTS

2009/0112522 A1 4/2009 Rasmussen

FOREIGN PATENT DOCUMENTS

| JP | 2002-352123 A | 6/2002 |
|---|---|---|
| WO | 2009/058880 A2 | 5/2009 |

OTHER PUBLICATIONS

Tang et al. "Sensor-Based Fast Thermal Evaluation Model for Energy Efficient High-Performance Datacenters." 2006 IEEE.*
Rikki Kirzner "Real Cost of Ownership of Network Computer Devices" Dec. 1997.*

* cited by examiner

*Primary Examiner* — Saif Alhija
(74) *Attorney, Agent, or Firm* — Rutan & Tucker LLP

(57) ABSTRACT

The invention provides a computer simulation system for simulating a data centre. The simulation system uses a logical representation of the data centre to perform the simulation. This logical representation includes a plurality of nodes representing devices in the data center. Each node has an input for applied load and outputs for electrical power drawn and losses in the form of heat output. Each node also has a function for calculating the outputs from the inputs. A first set of connections between the nodes represent electrical power drawn by one device in the data center from another device in the data center. A second set of connections between the nodes represent a thermal load applied by one device in the data center to another device in the data center. The simulator can be run for a series of different operating conditions to map data center efficiency, for example, or to assess the impact of different IT devices on the data center.

18 Claims, 22 Drawing Sheets

Energy and cost allocation with utilisation compensation

IT device simulation

IT device and Other IT Electrical Load

DATA CENTRE SIMULATOR

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

FIELD OF THE INVENTION

The present invention is concerned with methods and systems for simulating data centres. Embodiments of the invention are more specifically concerned with simulations that can determine and/or predict operating parameters of component elements of data centres as well as global operating parameters for a data centre as a whole. Operating parameters can include, for example, energy consumption, efficiency (e.g. DCIE) and/or operating costs.

CROSS-REFERENCE TO RELATED APPLICATIONS

This application claims the benefit of Great Britain Patent Application No. 0908514.3 which is herein incorporated by reference in its entirety.

BACKGROUND

Many operators install detailed metering into their data centre in order to try and understand energy and cost. This is expensive and fails to deliver the understanding of why the data centre performs as it does.

Known tools and 'calculators' assess only small parts of the data centre, either single components or small functional groups. These tools are ineffective as they fail to recognise that the data centre mechanical and electrical plant, IT equipment, management systems and applied IT workloads via software represent an interdependent system. Existing tools fail to span the full domain of Mechanical plant, Electrical plant, IT equipment, Software and User load and the variables involved in each of these areas.

These variables frequently exhibit correlation which can substantially compromise the output of tools with such a constrained functional domain. For example, user workloads tend to be lower in a corporate data centre when it is colder outside at night, meaning that an economised chiller system is likely to receive less load at the point where it is most efficient and more load at the point where it is least efficient. A degree day type component analysis is severely compromised in this instance.

This range of internal and external variables which impact the system rapidly exceeds the scope of manual analysis as the complex interactions and multiple factors in each step drive analysis errors.

It has been identified by many parties including the BCS Data Centre Specialist Group (DCSG) that a major obstruction to lower energy options within the data centre market is the lack of both effective energy use evaluation techniques and the ability to relate these to financial impacts in an effective and trustworthy fashion. This is compounded by a lack of trust in vendor environmental claims that are broadly assumed to be 'greenwash' in the absence of any independent arbiter or evaluation mechanism.

SUMMARY

A general proposal of embodiments of the present invention is to provide a data centre simulator that makes it possible to account for the interdependence of a range of internal and external variables that impact the overall system and the component parts of it; implementing a simulation framework and dependencies provides a structure to make this level of analysis reasonable and practical.

Time dependent variables included in the simulation framework may include: Applied user workload; Number of devices; Device capacity and capacity allocation; Power cost; External environmental conditions; Level of capacity allocation (utilisation); and Facility electrical loads. Non-time dependent variables may include: Device efficiency characteristics.

The approach adopted by some embodiments of the present invention is to create a simulation environment in which all of the major components of the data centre are simulated, from user workload on software through IT equipment, mechanical and electrical systems through to utility energy use. This environment allows for the range of external variables that influence efficiency to be applied coherently and in context of their correlation. The simulator, once set up to represent a facility can cope with very sparse metering data while still providing usefully accurate reporting and billing.

In some embodiments, the primary output of the tool is an analysis of the in use energy of each scenario, this is supported by the secondary output, a post simulation analysis of the basic cost of each scenario to provide the basis for business case justification of a lower energy scenario. Alternatively, the cost analysis may be performed within the main simulation rather than as a post simulation analysis.

In one aspect, the invention is concerned with a simulation of the entire data centre system comprising mechanical, electrical and IT equipment and their interactions with each other and external variables such as temperature. In contrast, existing approaches are restricted to part of the system or effects of specific devices or phenomena and as such do not provide useful answers as they are unable to place their results in the full context of all the variables impacting their behaviour or which are impacted by their behaviour.

Systems level simulation may include but is not limited to:

a. Power cost varying with time;
b. Carbon intensity varying with time;
c. Carbon cost varying with time;
d. External climate temperature and humidity varying with time;
e. Applied workloads varying with time;
f. IT device power draw varying with workload, configuration and state;
g. Applied electrical loads varying with time; and
h. Type, quantity, configuration and specification of devices varying with time.

The simulation approach allows the determination of key data regarding a facility that it would be extremely disruptive or impossible to measure for a working physical data centre. For example the 'fixed load' or 'chronic load' power drawn by the data centre at any point within simulation time, under any combination of variables such as external climate condition, internal operational and modular provisioning can be determined. This could not be measured in an operational facility as it would require that all IT load be regularly turned off in order to track this value. This enables the simulator to form the basis for effective per device, service or application allocation of cost and energy within the data centre which is not possible using traditional measurement and reporting methods.

In one aspect, the invention enables systems level simulation capable of representing, handling and returning output for systems with feedback loops. Feedback loops can occur in a data centre system, for example an air conditioning unit may draw power from power cabling and distribution equipment that resides within the area the air conditioning unit cools, creating a feedback loop.

In one aspect, the invention proposes a logical representation of the data centre allowing for simplified data entry to allow the system to be usefully modelled at an acceptable level of data gathering and input. This approach may include but is not limited to:

a. A layout or 'constructor' for the data centre containing general purpose nodes which are populated with devices of varying type:
 b. The layout may consist of an arbitrary number of nodes, with an arbitrary set of connections to represent any data centre or set of data centres;
 c. Device nodes which represent multiple devices of the same type and function operating as a group. These groups may be used to represent the full rated capacity and/or resilience through the use of multiple devices;
 d. Device nodes have an identified capacity representing the design or intended capacity of the group of devices within the node;
 e. Nodes are interconnected to describe the dependencies within the data centre. Interconnects typically represent either an energy flow; such as drawn electrical power or applied thermal load, or an applied load such as an IT workload; and
 f. Other special purpose nodes are included to assist the simulation, such as containing data or assisting in reaching solutions to loops where iteration is required.

In one aspect the invention proposes a method of allocation of data centre capital cost and energy to devices such as IT devices or applied loads such as electrical loads or application workloads that effectively recognises fixed and variable parts of the overall cost and energy use. By using the simulation concepts proposed here, embodiments of this method are able to effectively represent both allocated and utilised capacity at every device in the system, including overheads induced by the interaction of other components. Embodiments of this method are also able to effectively represent recurring and non recurring cost components of each device in the infrastructure including capital cost, lease purchase, maintenance costs etc. Costs of other parameters expressed by the user such as space within the data centre occupied by the equipment can also be accounted for if desired.

In one aspect, the invention proposes a method of allocation of space, cost and energy that factors the level of utilisation of these variables to enable allocation accounting for utilisation. This may, for example, be by:

a. Direct allocation of the occupied or utilised fraction of capacity at each point in simulated time, allowing for unallocated capacity, cost and energy within the results;
 b. Allocation including the instantaneous occupied or utilised fraction of capacity at each point in simulated time, ensuring that all costs are allocated to devices or loads;
 c. Allocation including the projected occupation or utilisation fraction of capacity over a time period, reflecting effective costs over this time period, thus allowing for effective cost planning for a data centre which will be filled out gradually after initial build out; and
 d. Allocation including the effects of modular installation, commissioning or provisioning of devices and capacity within the data centre.

In some embodiments of the invention, in which the simulation system comprises a plurality of nodes representing devices in the data centre, each node may be a 'black box' within the simulation and need not represent a continuous, monotonic or parameterised function which can be solved by traditional analytical mathematical means. This allows for nodes, for example, which:

a. Use data points for loss or efficiency by one or more variables;
 b. Use parameterised functions for loss or efficiency by one or more variables;
 c. Contain advanced functions, for example the simulation of control systems applied to plant such as chiller staging or economiser control;
 d. May represent one or more types of device, for example a 'chiller' node may contain the chiller pump(s), water pump(s) and dry cooler fan loads describing the performance of the set; and
 e. May perform distribution or transformation functions, for example a node may simulate the control software driven movement of virtual machine workloads across physical machines including putting physical machines into power saving or off states when net workloads do not require their capacity.

In some embodiments, where the simulator effectively represents the entire data centre system, it is possible to determine the answers to an arbitrary range of questions and scenarios. As such embodiments of the simulator can provide a framework for the further development of detailed and specialised component level simulation elements which may then be exercised in the full context of the dependent and driving elements and external factors of the data centre. For example a cooling economiser may be usefully evaluated considering the varying thermal load driven by varying IT workload, the varying cost of power and the varying external temperature through time in both daily and annual cycles.

Some embodiments provide a framework upon which further analysis and reporting systems may be built or provide a framework upon which advanced control systems which utilise the systems level understanding provided by the simulator. For example a control system may use forecasting or goal seeking in place of crude feedback systems and 'tuning parameters' to optimise behaviour to the given target.

In one aspect, the core simulation of interconnected nodes is wrapped in a series of outer layers of data provision, iteration and analysis. This allows the multiple internal and external variables to be changed together under simulation time for meaningful analysis. Specific subsets of variables can be swept in any combination for analysis such as applied electrical load and external temperature to report infrastructure efficiency over the range of both variables. It also enables, for instance, Monte-Carlo and goal seeking analysis of any variable or set of variables with or without correlation.

A simulator in accordance with some embodiments is able to report, for example:

a. The achieved data centre infrastructure efficiency by:
   i. External temperature and applied electrical load; and
   ii. Time, including all parameters, external climate, applied electrical load, modular provisioning of devices.
b. The achieved 'cost per delivered kilowatt hour of energy to IT devices' based upon the energy losses in the infrastructure by:
   i. External temperature and applied electrical load; and
   ii. Time, including all parameters, external climate, applied electrical load, modular provisioning of devices.
c. The achieved 'cost per delivered kilowatt hour of energy to IT devices' based upon the energy losses and the cost of the data centre building, mechanical and electrical plant, installation, maintenance and operation by:
   i. External temperature and applied electrical load; and
   ii. Time, including all parameters, external climate, applied electrical load, modular provisioning of devices.
d. The operational power cost for a described load based upon the energy losses in the infrastructure by time, including all parameters, external climate, applied electrical load, modular provisioning of devices.
e. The 'fully loaded' operational power cost for a described load based upon the energy losses and the cost of the data centre building, mechanical and electrical plant, installation, maintenance and operation by time, including all parameters, external climate, applied electrical load, modular provisioning of devices.
f. The contribution to the overall, at the energy feed to the building, electrical load, IT device or workload energy use of any node in the layout based upon the energy losses within the system.
g. The contribution to an electrical load, IT device or workload cost of any node in the layout based upon the energy losses and the cost of the data centre building, mechanical and electrical plant, installation, maintenance and operation.
h. The cost allocable to any IT device, applied workload or group of workloads representing an application or service applied to group(s) of IT devices in one or more facilities accruing from:
   i. The capital cost of hardware and installation;
   ii. The maintenance cost of hardware, including maintenance contracts and human time;
   iii. The capital and operational costs of the mechanical and electrical infrastructure of the data centre based upon the utilised portion of that capacity including modular provisioning, with options to factor utilisation in a number of ways. This may be evaluated by load over time or by mean or peak load;
   iv. The matching unutilised capital and operational costs of the mechanical and electrical infrastructure of the data centre based upon the portion of that capacity that is not utilised by the device or workload including modular provisioning, with options to factor utilisation in a number of ways;
   v. The cost of power delivered to the IT device;
   vi. The cost of the power lost in variable losses in the data centre infrastructure due to the power delivered to the IT device;
   vii. The device(s) or workload(s) share of the cost of the power lost in the fixed losses of the data centre infrastructure including modular provisioning, with options to factor utilisation in a number of ways;
   viii. The energy and associated carbon delivered to the IT device;
   ix. The energy and associated carbon lost in variable losses in the data centre infrastructure due to the energy delivered to the IT device; and
   x. The device(s) or workload(s) share of the energy and associated carbon lost in the fixed losses of the data centre infrastructure including modular provisioning, with options to factor utilisation in a number of ways.

In one aspect, the nodes within the simulation pass data using an extensible data format allowing for much richer data than simply Watts and Cost to be passed and evaluated. This data may include:

a. A range of categories of cost; and
b. Power passed as a magnitude vector of the in phase and out of phase currents drawn by a device for an arbitrary number of harmonics. This allows for:
   i. Effective description of the power factor of a device load;
   ii. Effective summing of the load from multiple devices including the full or partial cancellation of harmonic components, for example capacitive load against inductive load;
   iii. Nodes whose capacity or performance is impacted by the power factor of the applied load; and
   iv. Nodes which affect the power factor of an applied load such as power factor correction circuits or transformers.
c. Additional values such as absolute or relative humidity, water mass or water mass rate to be passed between nodes. This allows for:
   i. Effective description of the humidifying or dehumidifying effects of devices;
   ii. Effective description of the impact of humidity on the efficiency, capacity and load presented by devices, for example the varying Sensible Heat Ratio of air conditioning units under varying humidity;
   iii. Effective description of the impact of varying humidity set points, ranges or targets;
   iv. Effective modelling of the impact of external air exchange systems; and
   v. Effective modelling of the benefits of adiabatic humidification systems.

In one aspect, the simulator is able to perform a range of energy and cost allocations for the data centre or components within it, including "Fair share allocation" and "True allocation".

In Fair share allocation the simulator is able to represent the 'fair share' of the overall energy and cost of the data centre to a specific load, device or group of devices. This takes into account the allocation and draw of energy and the level of utilisation of the data centre. This cost is likely to be used as the basis for an internal charge back metric.

In True allocation the simulator is able to represent the specific load, device or group of devices cost and energy consumption taking into account allocation, draw and level of utilisation. This cost is specific to the device or load and represents the actual share of energy, power and cooling chain component loss and cost actually incurred by that specific load or device. This is likely to be used for internal delivery cost analysis.

An example of the difference between 'true' and 'fair share' costs would be two identical servers in a data centre under identical workload with identical provisioned power and cooling capacity, one of which is supplied with power through a more expensive set of equipment than the other whose power supply equipment is cheaper but has higher energy losses. In 'fair share' analysis the cost of the power delivery equipment and energy losses is averaged across all of the IT load and the two servers would accrue the same energy and cost. In 'true' analysis one server will accrue higher power delivery infrastructure costs but lower energy costs than the other, representing a more realistic analysis of the comparative costs.

The simulator of some embodiments, in a "Marginal allocation" mode, is able to report the marginal energy and cost of an additional load, device or device group in the data centre. This may include capital and operational costs and energy of additional devices where modular infrastructure capacity thresholds are triggered or triggered at a different time in the simulation.

These varied modes of analysis provide substantial business information to support decisions on, for instance; Service pricing, Equipment selection and deployment, and/or Workload allocation and scheduling.

Some embodiments of methods and simulation systems in accordance with aspects of the present invention are capable of capacity analysis. As the simulator can know the rated capacity of each device group at each node as well as the rated capacities of the devices within the nodes and their operating mechanism the simulator is capable of:
  a. Raising warnings and errors where a device or node is provisioned beyond its rated capacity or a threshold (e.g. 90%) of the rated capacity;
  b. Automatically determining the time points where first or additional devices would need to be installed into nodes to meet the projected electrical or IT workloads for the facility. This also provides for detailed financial planning as the cost analysis is able to apply capital, installation, maintenance etc. costs for the additional equipment at the required time of installation; and
  c. Both warnings and capacity installation thresholds are capable of considering the impacts of the operating facility on the capacity of the device(s) or node(s), for example, the capacity of elements of electrical infrastructure can depend upon the power factor of the applied load whilst the capacity of the cooling systems can depend upon both internal and external temperatures.

Embodiments can also be used for decision support by utilising the varied modes of cost and energy analysis to provide substantial business information, if necessary in real time when connected to monitoring and asset database systems to support decisions on:
  a. Service pricing;
  b. Equipment selection and deployment; and
  c. Workload allocation and scheduling.

Embodiments can also be used for billing applications. The detailed financial analysis available from the simulator can provide a fair and justifiable basis for billing of data centre services as well as performing analysis on the differences between the operators cost and their revenue under varying customer behaviours and varying external factors such as the cost of energy or carbon.

In one aspect, the invention provides a simulator that is capable of representing multiple path connections with varied splitter logic. This may be used to represent, for example:
  a. Devices with multiple power paths through the infrastructure, for example a server may have two power connections, one on a UPS protected feed and one on a non-UPS protected feed. The simulator is able to effectively represent both the provisioned and drawn power costs under any given behaviour of power split between the two supplies; and
  b. Devices with multiple cooling paths through the infrastructure, for example a server chassis may be partially air cooled and partially direct water cooled. The simulator is able to effectively represent both the provisioned and applied thermal loads and resulting costs under any given behaviour of thermal load split and temperature differences between the two cooling paths, perhaps air at 25 degrees Celcius and water for the fluid cooling at 50 degrees Celcius.

BRIEF DESCRIPTION OF THE DRAWING

Embodiments and optional features of the invention are described below, with reference to the accompanying drawings, in which:

FIG. 6 illustrates the scope of the simulator coverage for an embodiment of the present invention and the variability in the operating parameters of a data centre that the simulator can account for;

DETAILED DESCRIPTION

Data Centre Overview

The exemplary data centre simulator described below is an analysis tool which operates in two basic modes, data centre infrastructure performance and IT device analysis.

Reporting and Analysis

Tools and metrics for the data centre can be broadly categorised as either reporting or analysis.

Reporting Measures and Metrics

Reporting metrics include the Green Grid DCIE[1] metric of electrical power transfer efficiency. This metric expresses the efficiency with which the data centre mechanical and electrical plant transfers energy from the building supply to the IT equipment.

[1] Data Center Infrastructure Efficiency $$DCIE = \frac{IT\ Equipment\ Power}{Total\ Facility\ Power}$$

The DCIE can be measured either at a single point in time or across a time period. A DCIE report for a data centre gives a view of the achieved efficiency under the specific combination of conditions during the measurement period.

Analysis and Diagnostic Tools

While the reporting metric approach is effective in providing initial recognition of a potential efficiency problem, there is more required to define a solution. There is also a requirement for analysis tools to determine why the efficiency is as measured and to assist operators in evaluation and business justification of effective financial and environmental improvements.

The data centre simulator is such an analysis tool, designed to help provide understanding and answers to these questions. The simulator provides insight into both the data centre (building) infrastructure and how this interacts with the IT hardware it supports.

Data Centre Efficiency

The first mode of the simulator tool allows the modelling and analysis of the efficiency of the data centre infrastructure, the output from this stage is provided as a DCIE report of the performance as simulated.

Overview of Data Centre Efficiency

To explain the output of this mode it is necessary to provide a brief overview of the behaviour of the data centre mechanical and electrical infrastructure.

Figure 1:
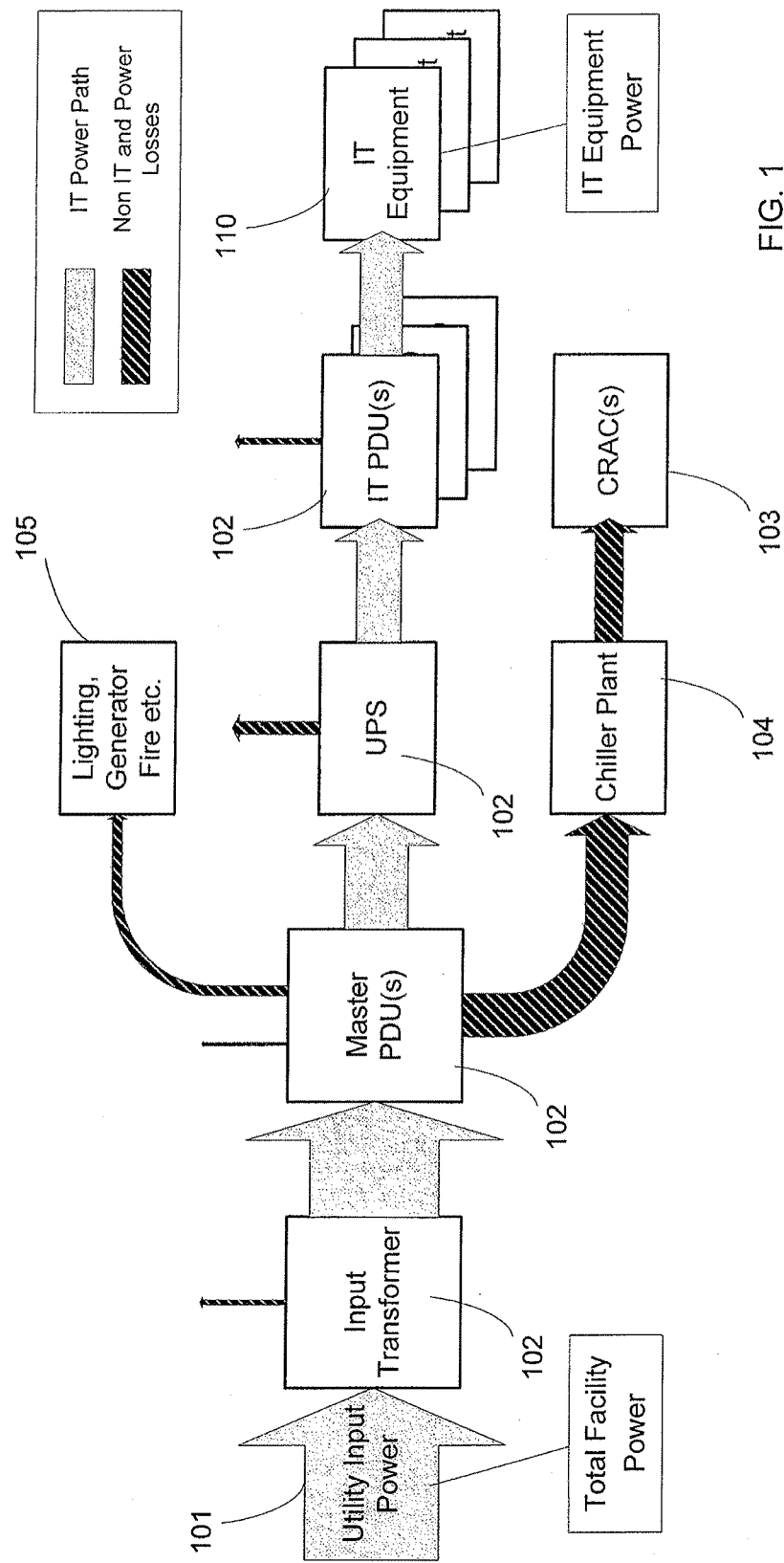
FIG. 1 illustrates the IT power delivery path and losses in a typical data centre.

As shown in FIG. 1, power is supplied to the data centre from, typically, a utility feed 101. This power then passes through a set of electrical power conversion, conditioning and distribution devices 102 on the way to the IT equipment 110. Each of these devices exhibits some inefficiency and some of the power is lost. Also consuming power is the mechanical plant of the data centre, mostly the CRAC[2] units 103 and the chiller plant 104. Finally there will be ancillary services 105 such as lighting, fire suppression and generator pre-heaters which also consume power.

[2] Computer Room Air Conditioner

Figure 2:
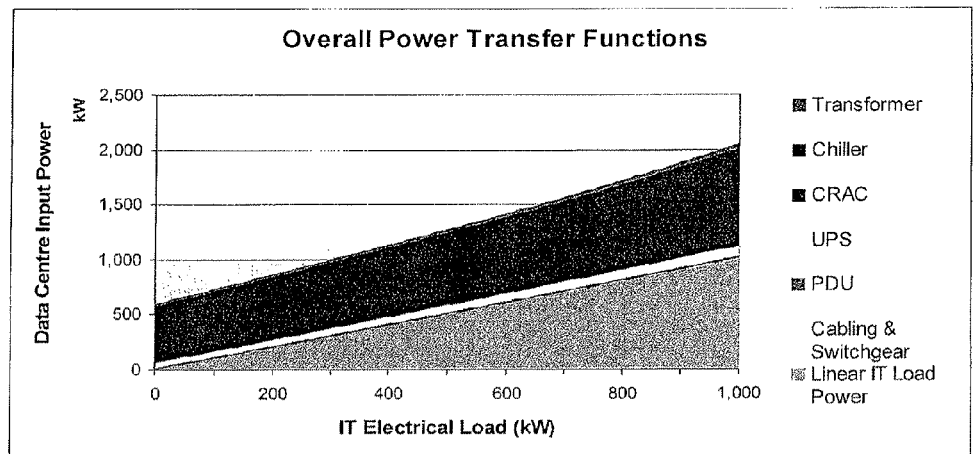
FIG. 2 shows the change with IT load of data centre input power required to deliver power to a 1 MW IT electrical load.

In FIG. 2 we show a simplified view of the impact of these losses on the data centre utility input power required to deliver power to a 1 MW IT electrical load. As shown, the total power demand at full load is around 205% of the IT electrical load. Of more importance however, is the fixed overhead[3] of the data centre mechanical and electrical infrastructure. At zero IT electrical load this plant would still draw around 600 kW from the utility.

Figure 3:
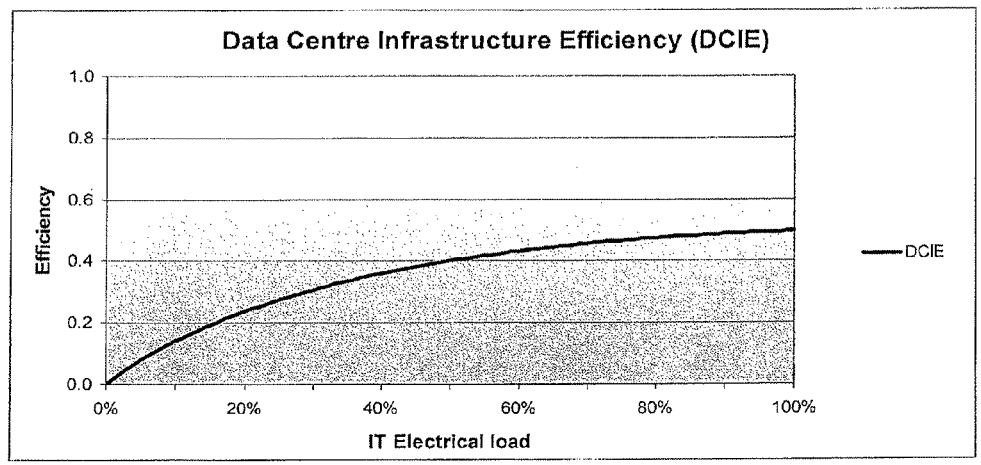
FIG. 3 shows the change in data centre efficiency as IT electrical load increases from zero to full load.

[3] See the BCS paper "Data Centre Efficiency Metrics" for a more detailed exploration of this issue, http://www.bcs.org/datacentreenergy This fixed overhead means that the data centre efficiency (DCIE) will vary with the IT electrical load in the data centre. As shown in FIG. 3, at full load the DCIE is just under 0.5 but at 20% of the full rated load the DCIE has fallen to 0.23 due to the changing ratio between the fixed and variable power consumption.

This variability of data centre efficiency with load means that we cannot usefully perform analysis or comparison of data centres with measured DCIE values as these reported values do not provide sufficient information to compare data centres or evaluate the impact of any changes.

The electrical load and therefore the achieved efficiency of the data centre will vary with time both as IT equipment is installed and changed in the data centre and, with more modern IT equipment, as the applied IT workload changes. Virtualisation, grid and MAID[4] technologies are all allowing for large variations in IT electrical load as they are installed into data centres through their ability to allow devices to idle, sleep or turn off when not required.

Figure 4:
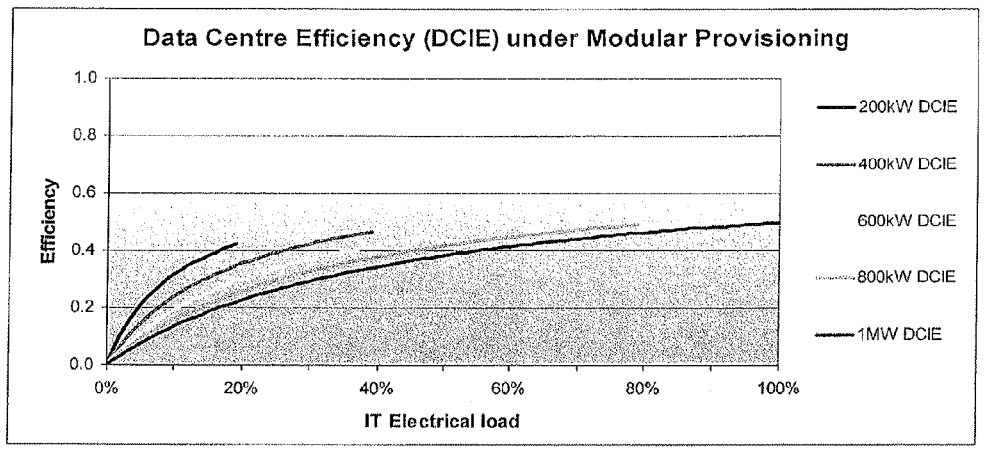
FIG. 4 shows data centre efficiency against IT load under a modular provisioning scenario.

[4] Massive Array of Idle Disks, a RAID system which turns off hard disks when not in use Data Centre Efficiency and Modular Provisioning An example of complex DCIE variability is a more modern design, modular data centre. In this example the data centre mechanical and electrical plant is rolled out in stages. The PDU[5], UPS[6], CRAC and chiller systems in 200 kW[7] steps of rated IT electrical load to the 1 MW full capacity. As shown in FIG. 4 we now have a family of DCIE curves. The modular deployment provides substantial efficiency improvements in the early stages of the facility operation where the facility is at low utilisation as well as reducing initial capital costs and improving flexibility. The fixed overhead of the data centre is reduced at lower rated capacities through the reduced quantities of mechanical and electrical equipment and their reduced losses. This, fixed modular approach is of less value in a facility where the IT equipment can exhibit large variations in electrical load.

[5] Power Distribution Unit, free standing large unit, not the power strips in racks
[6] Uninterruptible Power Supply
[7] 200 kW IT electrical load steps, the actual increments are larger for most devices due to the losses from other devices in the power and cooling systems, these will be ~200 kW for the CRAC units and larger for the Transformer Data Centre Efficiency and External Temperature The other major influencing factor on data centre efficiency is the external temperature. The efficiency of the data centre cooling systems is influenced by the external temperature into which they are trying to reject energy as heat.

Figure 5:
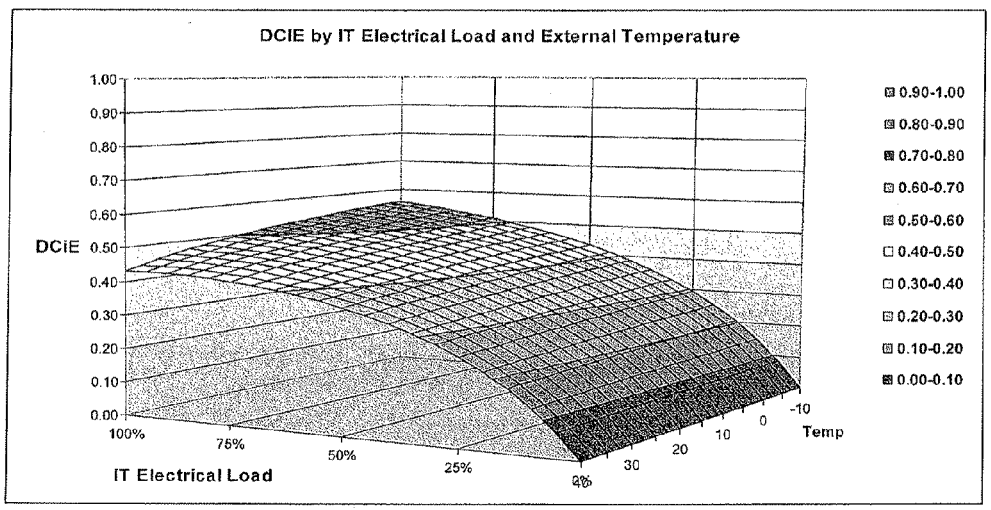
FIG. 5 shows a plot of DCIE by IT electrical load and external temperature.

As shown in FIG. 5 the efficiency of the data centre varies substantially with external temperature. In order to effectively understand the cost and energy efficiency characteristics of a data centre or forecast the impact of changes to the mechanical and electrical or IT systems it is necessary to understand the variation of efficiency with both IT electrical load and external temperature.

Data Centre Simulation

The data centre simulator has been designed as a framework tool to encompass the full range of factors affecting data centre cost and energy performance.

Scope of the Simulator

The data centre is a complex environment which covers a broad range of technical disciplines, skill sets and frequently organisational roles. This has led to the development of a range of component calculators and discipline specific tools which seek to address the energy and cost issues of a modern data centre. The simulator covers the range from the IT workloads applied to the IT devices through the electrical and mechanical systems through to the energy supplies and external climate.

The Need for System Level Simulation

As discussed above, the data centre plant efficiency is not a constant that can be measured and then used for analysis or comparison of data centres. The electrical load applied to the infrastructure by the IT equipment affects the infrastructure efficiency. The efficiency of the data centre is also affected by the external temperature which varies with the time of day and season. Whilst much legacy IT equipment drew close to its full power irrespective of load and could be viewed from a mechanical and electrical perspective as little more than expensive resistors once installed in the data centre, modern IT equipment is being designed to exhibit a far stronger connection between the applied IT workload and the electrical power draw. As both the IT workload, driving the IT electrical load and the external temperature vary with the time of day we cannot usefully evaluate the efficiency of the data centre by external temperature without considering the variation in IT electrical load due to IT workload at the same time. The development and implementation of mobile virtual machines leading to real grid computing technologies makes this issue more significant.

This interdependence makes it difficult to perform analysis of the data centre or forecast the impact of any changes to any part of the data centre without considering all of the external variables and the whole data centre as a system. With this range of connected external factors, it rapidly becomes difficult to analyse the performance of a data centre design or the impact of any change to an existing facility.

Figure 6:
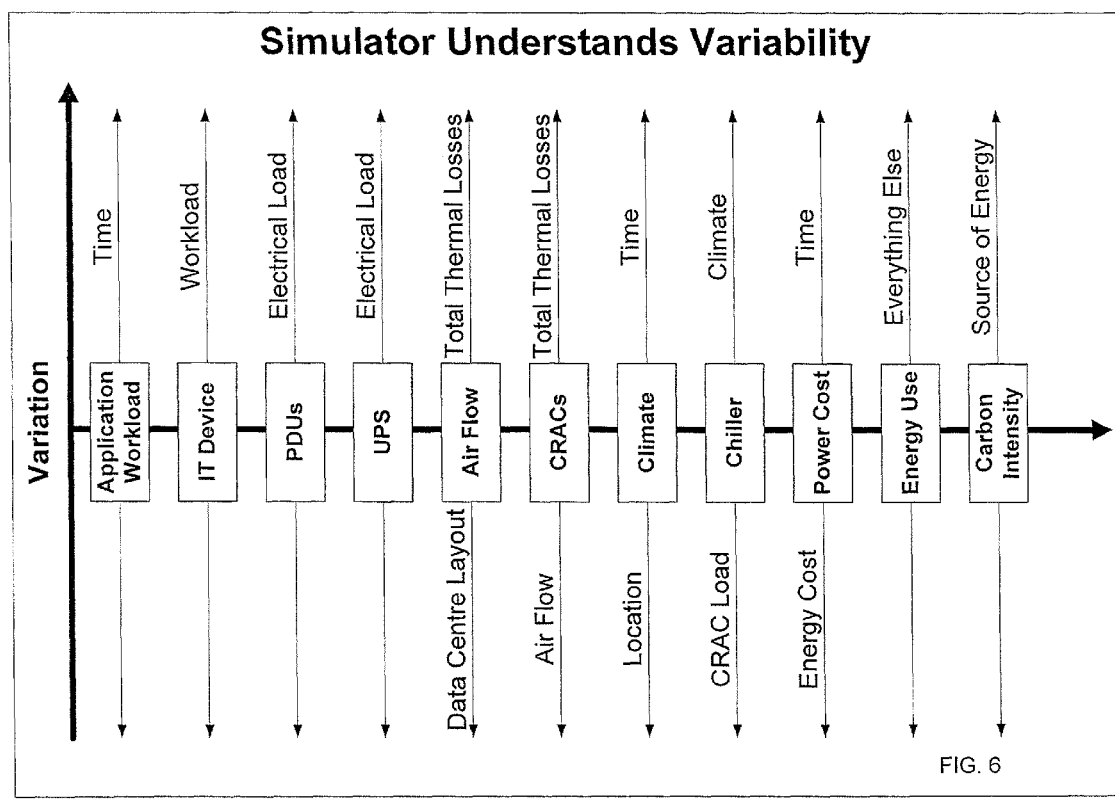

As shown in FIG. 6, the full system simulator described here captures the variability of each coverage area and provides an operating framework in which simulation models of each component can operate, as part of the full system whilst considering only their direct dependencies. The user can specify the external variables such as the cost of power or IT workload by time and the performance of devices such as a UPS by applied load and the simulator will work through the variables and dependencies.

Simulation Approach

The basic approach of the simulator is to create a representation of the data centre using a set of nodes which represent the individual devices. This is then evaluated for a single set of input values and the resulting data retained for that step. The simulator then iterates through the steps required to produce the simulation output requested, applying the data provided for the external variables as required.

More specifically, each element of the data centre system is represented as an individual node. A node contains the logic to simulate that element. A node is provided with device performance data and external variables by the simulator. Nodes are connected together in the simulator using defined interfaces.

Both power (electrical energy) and thermal loads are represented in the energy simulator. These loads may take the form of simple numbers or structured arrays of values to represent complex constructs such as the phase of frequency harmonics making up an electrical 'power factor'.

The simulator treats each node as a 'black box' and is therefore not restricted to simplified continuous functions but is able to incorporate complex, disjoint device behaviours up to and including the simulation of complex control systems.

The simulator is able to represent feedback loops within the infrastructure that make traditional analysis difficult. For example an air conditioning unit may be powered from a device which is in the area the unit is cooling, as the air conditioning unit handles the thermal load in the area it draws power, this induces further losses in the power supply device, increasing the thermal losses which the air conditioning unit must deal with, increasing the power consumption etc.

These approaches substantially simplify the creation of device specific simulation components by providing a full environment and context for device specific functional representations.

Figure 7:
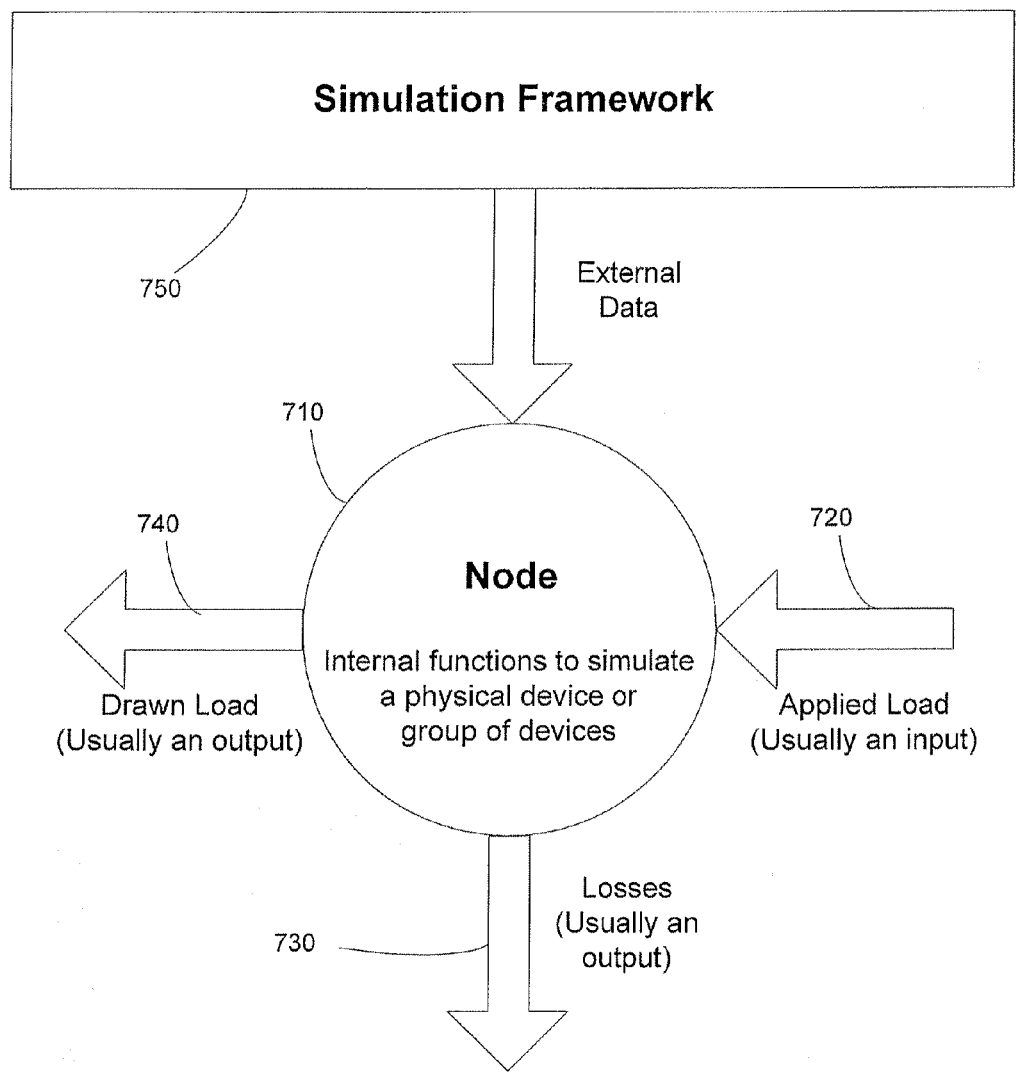
FIG. 7 schematically illustrates an individual node of the simulation environment of an embodiment of the invention.

FIG. 7 schematically illustrates an individual node 710 of the simulation environment.

Each node 710 has three basic connections to other nodes within the modelled structure:
  1) The applied load 720, be that an electrical, thermal, application workload or other;
  2) The losses 730 incurred in handling the applied load 720; and
  3) The drawn load 740 resulting from handling the applied load 720.

Each node also has access to any external data it requires to perform its simulation. The external data is supplied by the simulation framework 750. This allows for data which varies with one of the simulation variables such as time.

For example, a node representing an electrical infrastructure element would have an applied load representing the power drawn by the connected devices, the node would then suffer some level of losses dependent upon the load as defined by the node model and the supplied parameters. These losses would be provided at the losses interface and likely collected as thermal losses to be taken to an air conditioning node. In an electrical node the losses are typically summed with the applied load to provide the drawn load. External data might include the capacity of the devices at the electrical node, the required performance data and any variable dependent data such as the external climate conditions for a chiller plant node for example.

The nodes used in the data center simulator can be considered to fall into five basic types:
  a. 'Electrical nodes' 810 are used to represent elements of the electrical (power delivery) infrastructure of the data centre;
  b. 'Thermal nodes' 820 are used to represent elements of the mechanical (heat removal) infrastructure of the data centre;
  c. 'Load nodes' 830 are used to apply loads to devices. This includes electrical & thermal loads applied to the infrastructure as well as workloads applied to IT Devices;
  d. 'Environment nodes' 840 act as a source or sink for thermal emissions of the data centre; and e. 'Summing nodes' 850 are responsible for collating a set of loads, applying a unifying function (possibly the arithmetic sum) and passing the joined loads on to another node. These may also function as splitter nodes and divert varying amounts or proportions of a load to other nodes.

Figure 8:
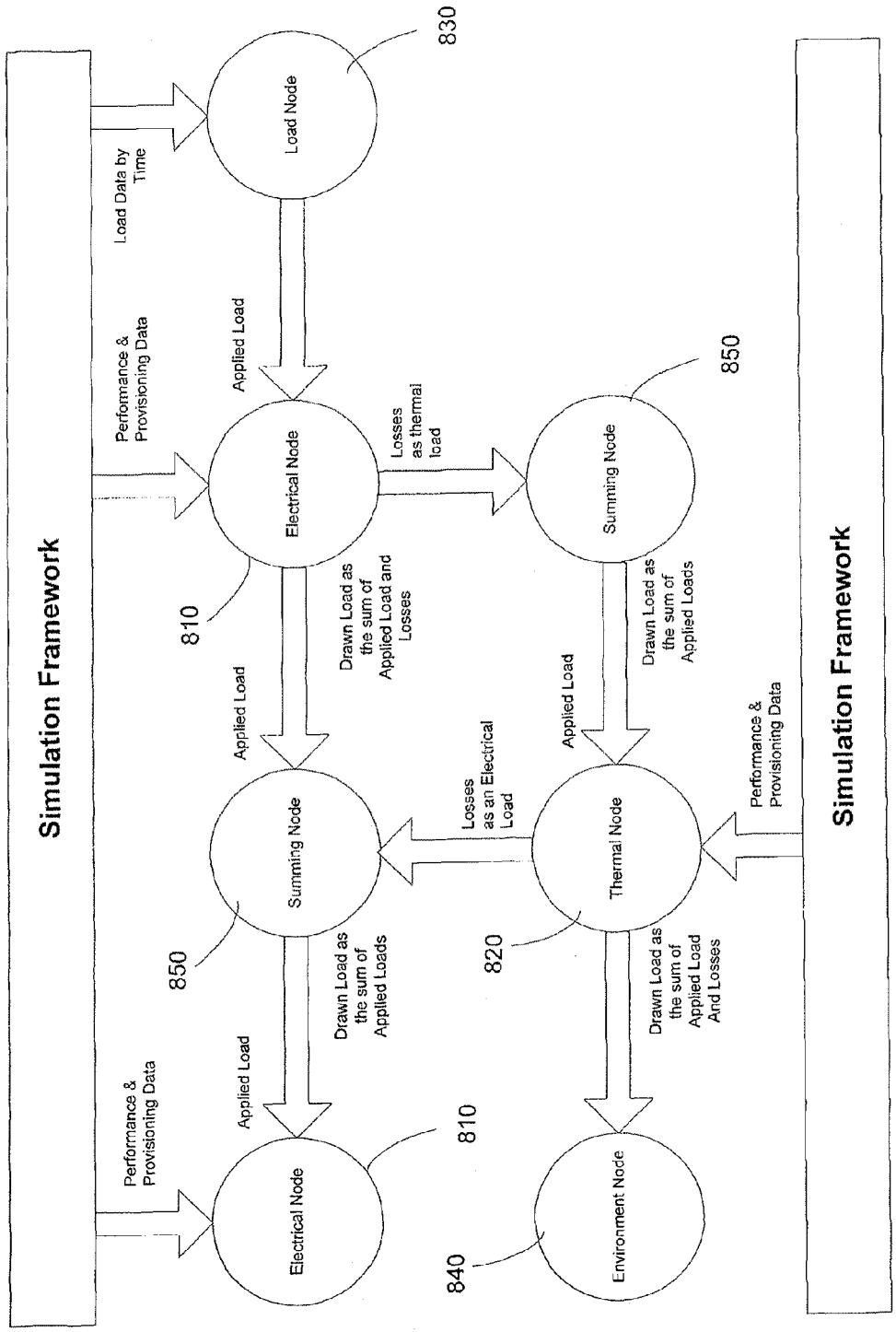
FIG. 8 illustrates the way in which multiple nodes of different types can be connected to one another in a simulation of a data centre.

FIG. 8 illustrates how these various node types might be connected in a data centre simulator.

Device Nodes

The basic element of simulation is the device node. Each node represents one instance of a type of device, for example an Uninterruptible Power Supply. The node has inputs to provide the performance data for that device as well as the applied load and any other external factors that the device node requires to determine its behaviour such as external temperature for a chiller plant.

The device node also has at least two outputs, load and loss, typically the electrical power drawn and the heat output. Nodes are not aware of time or any other factors which do not directly impact the node; the simulator is responsible for ensuring that all applied parameters are correct for that step in the simulation.

The basic device types represented are:

TABLE 1

Basic device node types

| Device node type | Performance data type | Depends upon |
| --- | --- | --- |
| IT electrical loads | Load source | Time |
| Lighting and other overheads | Load source | Time |
| Uninterruptible Power Supply | Loss by electrical load | Electrical load |
| Power Distribution Units | Loss by electrical load | Electrical load |
| Cabling | Loss by electrical load | Electrical load |
| Transformers | Loss by electrical load | Electrical load |
| Computer Room Air Conditioning units | Electrical load by thermal load | Thermal load |
| Chiller plant components | Electrical load by thermal load and temperature | Thermal load |

Power Chain

Figure 9:
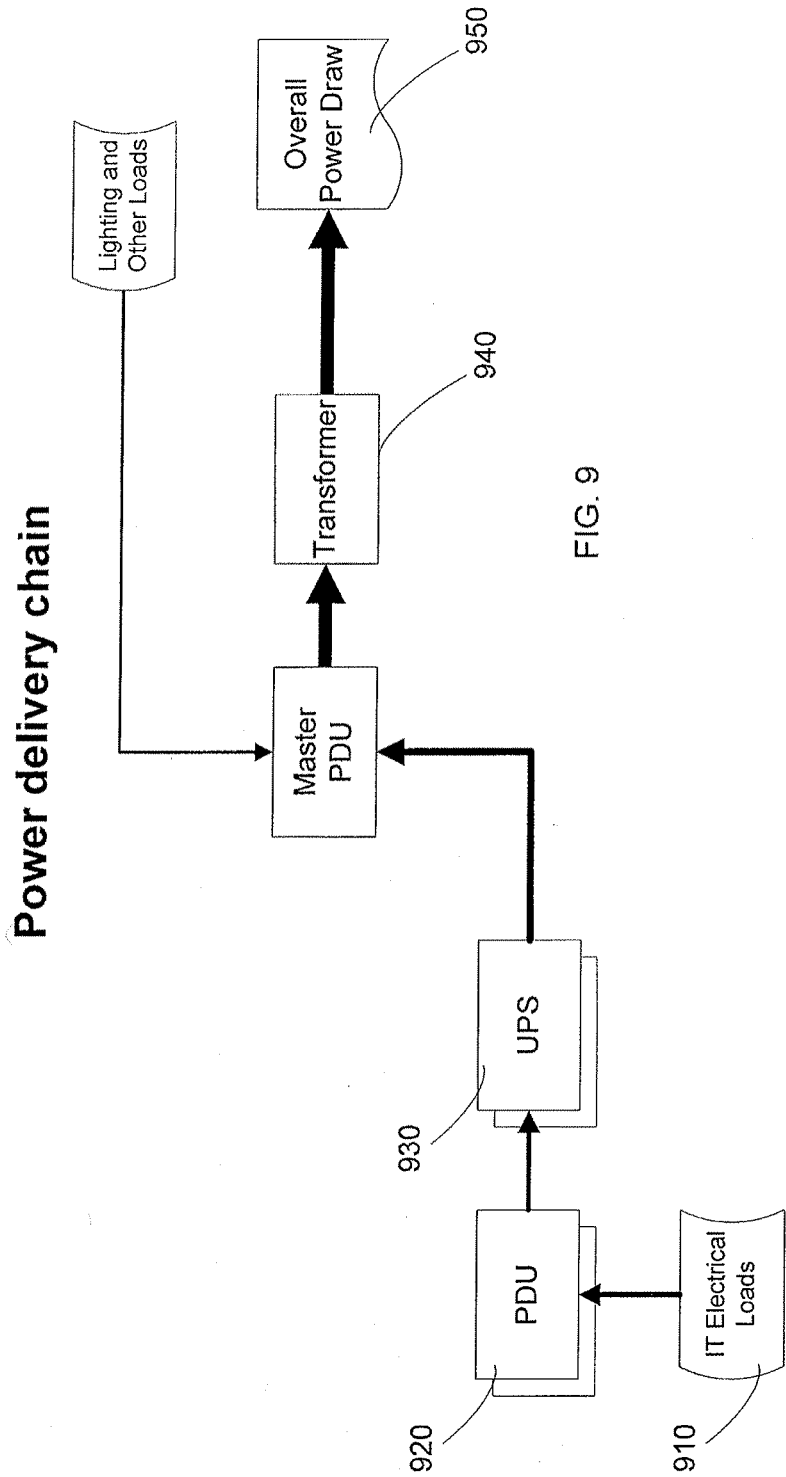
FIG. 9 shows device nodes connected to simulate the power delivery chain of a data centre, the power transfer being illustrated with solid lines.

The nodes are connected within the simulator to represent the energy paths within the data centre. The first energy path is the electrical power delivery chain formed by the electrical plant of the data centre. An example of this is shown in FIG. 9.

In this simplified example we start with the IT electrical load node 910 which is used by the simulator to apply a load to the data centre. This load source is electrically connected to a PDU node 920. The PDU node has a set of data describing the losses it incurs delivering power, the PDU node adds these losses to the power drawn by the IT electrical load node 910 and passes this load on to the UPS 930, which adds it's losses and so on until we reach the transformer 940 and the overall direct energy use 950 of the data centre electrical system.

Thermal Chain

Figure 10:
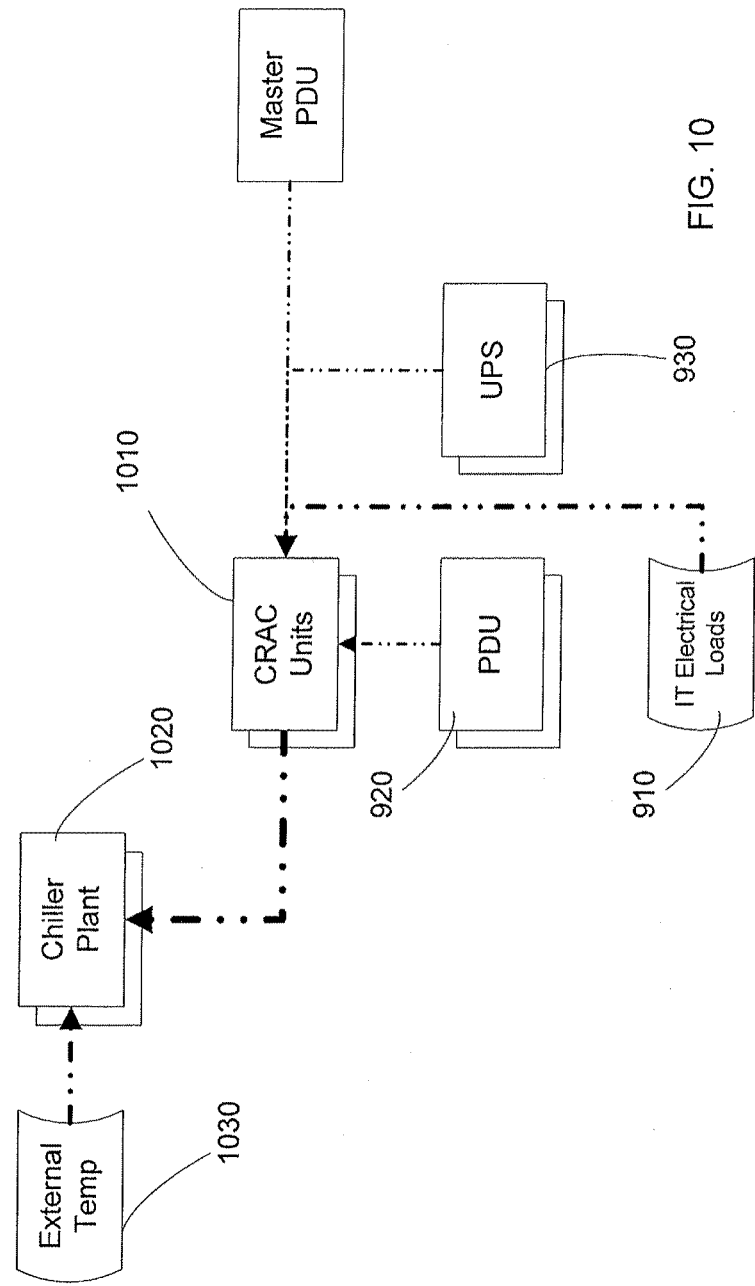
FIG. 10 shows device nodes connected to simulate the thermal chain a data centre, the thermal flows being shown in chain link lines.

The second major energy path in the data centre infrastructure is the thermal chain formed by the mechanical plant. An example is shown in FIG. 10.

In this, again, simplified, example we are dealing with the thermal loads within the data centre. Each of the nodes from the electrical chain that exhibits thermal loss within the cooled area of the data centre is included. The IT electrical loads effectively 'lose' their entire input power as heat whilst the electrical infrastructure only rejects the node losses as heat. These thermal loads are summed and applied to the CRAC units which are responsible for removing the heat from the cooled area of the data centre. The CRAC node 1010 has a loss function which expresses the electrical power consumed to deal with a given applied thermal load, this is mostly fan motor power although in a DX or hybrid system this may also be compressor or pump power. Note that more advanced models of the CRAC unit may also represent the dehumidification losses due to the split between sensible and latent cooling at the working temperatures and humidities as well as the electrical load of re-humidification where necessary. This loss is then added to the thermal load and applied to the chiller plant 1020. The chiller plant node uses both the external temperature 1030 and the applied thermal load to determine its energy consumption.

Connected Chains and Iteration

Figure 11:
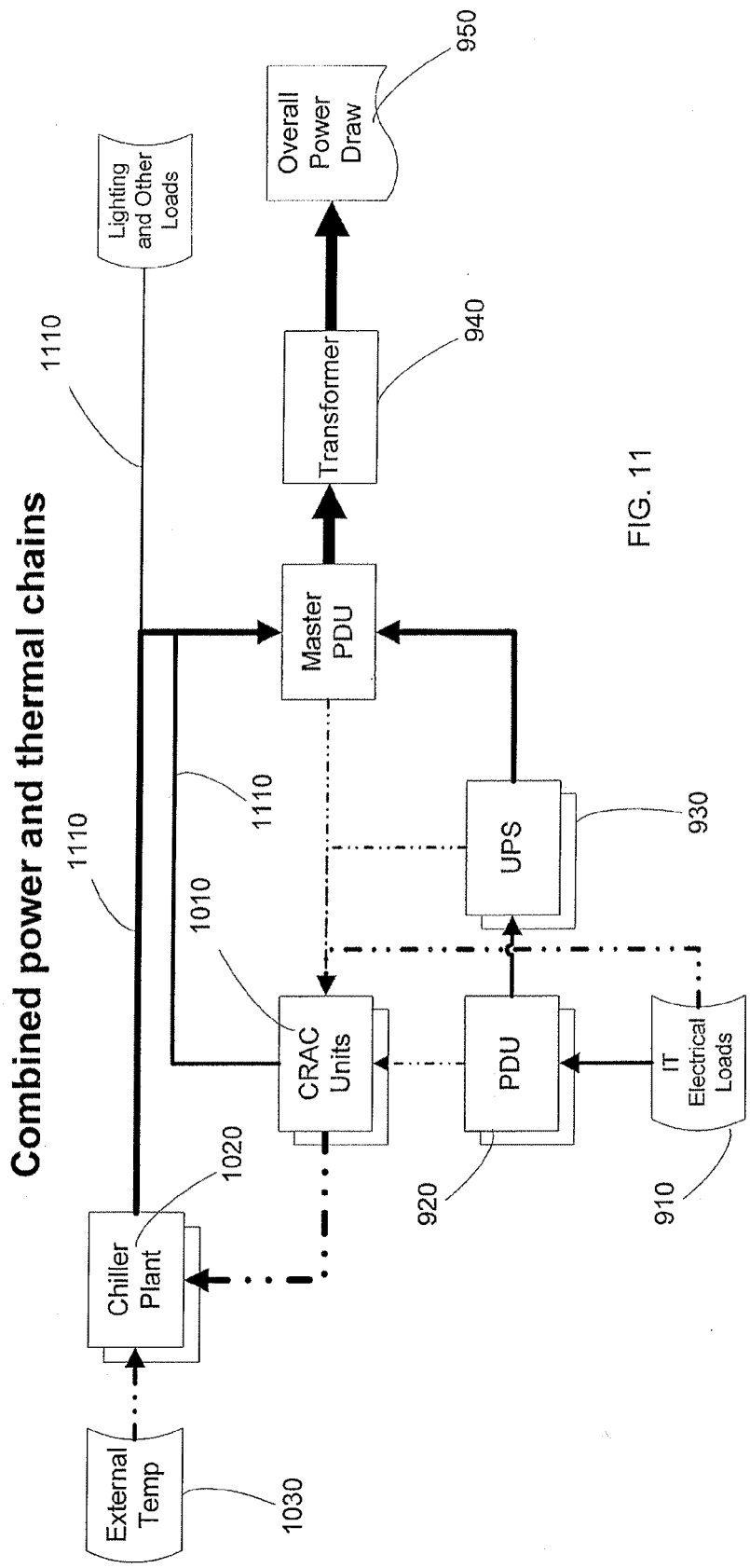
FIG. 11 shows the device nodes, power delivery connections and thermal connections of FIGS. 9 and 10 merged.

The final step in preparing the node model for simulation is to connect the power and thermal chains as shown in FIG. 11.

In addition to the basic chains we also apply the power consumed by the CRAC and Chiller plant nodes of the mechanical plant to the nodes of the electrical plant (represented by connections 1110). One important aspect of this is that the nodes support feedback loops. For example the CRAC units 1010 may be fed from the UPS power feed creating such a loop where the power drawn by the CRAC units 1010 increases the load on the UPS 930, thus increasing its losses and the thermal load applied to the CRAC units 1010, thus their power draw and the load on the UPS etc. Where these loops occur the simulator simply iterates until the loads stabilise and the working result of the system is achieved.

Simulation Steps

With the data centre electrical and mechanical chains connected, the data centre efficiency simulation can be performed. The output of this is the surface plot of DCIE against both IT electrical load and external temperature.

To do this the simulator framework sets up at the core simulation of connected nodes, loads the performance data values into those nodes and then sets the first temperature and IT electrical load point as inputs. This produces the first output efficiency data point which is retained. The IT electrical load is then increased in steps (e.g. steps of 5%) from 0% up to 100% of the rated IT electrical load. This produces an efficiency against load curve for a single temperature similar to that shown in FIG. 3 calculated for 5% steps in electrical load.

The simulator framework then increments the temperature by a requested step size (e.g. 5° C.) and repeats the sweep of load from 0% to 100% storing the achieved efficiency for this temperature. The temperature is incremented until the upper temperature bound of the simulation is reached and the full grid of DCIE by both IT electrical load and external temperature is complete to produce the surface plot as shown in FIG. 5 calculated for 5% electrical load and 5° C. steps.

Layout Logical Representation

The simulator uses layouts which are logical representations of the data centre mechanical and electrical infrastructure. These simplified layouts provide an effective approximation of the performance of the data centre with substantially reduced complexity. The simulator core is capable of simulating a very large number of nodes but this provides only limited additional accuracy and becomes very data centre specific.

Figure 12:
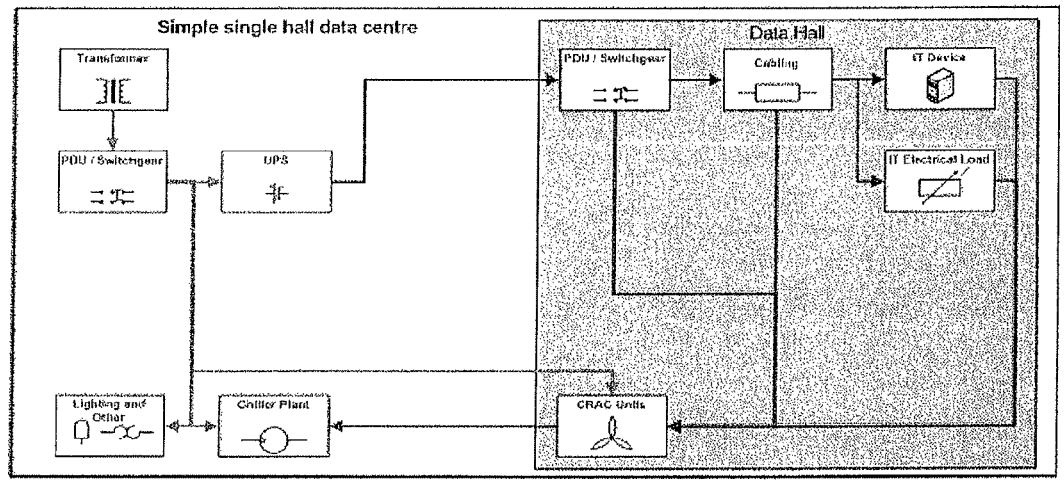
FIG. 12 is a representation of a simple, single data hall data centre.

A simple, single data hall data centre is represented in FIG. 12. This is a simple data centre with UPS protected power for the IT devices and CRAC units only on the data floor. No other area of the data centre is cooled from the main chiller plant.

Multiple Devices and Resilience

In the logical representation layouts only a single node for each device type is given. This does not indicate that there is only one device, for example in the layout in FIG. 12 it is expected that there is more than one UPS but that the way they are deployed allows us to represent them logically as a single node.

When configuring a node the parameters of the individual device are provided, generally the rated capacity and the load loss data. These are then supplemented by information to allow the simulator to understand the operating mode including the resilience levels. Taking the UPS node in FIG. 12 as an example the following data might be provided:

The UPS devices are rated at 300 kW each
There are three UPS in N+1 resilience providing a rated capacity of 600 kW (300 kW*(3−1)=600 kW)
The +1 UPS is in active load sharing mode and therefore each UPS will receive ⅓ of the applied electrical load

TABLE 2

Examples of node resilience and capacity data

| | Scenario 1 | Scenario 2 | Scenario 3 |
|---|---|---|---|
| Rated device capacity | 300 kW | 300 kW | 300 kW |
| Provisioned capacity | 600 kW | 600 kW | 600 kW |
| Resilience level | N + 1 | N + 1 | 2(N + 1) |
| Operating mode | Active load sharing | Standby | Active load sharing |
| Total device count | 3 | 3 | 6 |
| Total device capacity | 900 kW | 900 kW | 1800 kW |
| Active device count | 3 | 2 | 6 |
| Active device capacity | 900 kW | 600 kW | 1800 kW |
| Load at each device | ⅓ | ½ | ⅙ |
| Part of device capacity at full provisioned load | ⅔ | 1 | ⅓ |

Table 2 shows three examples of how the UPS capacity at this node might be logically represented. The simulator is not a data centre reliability and maintainability assessment tool and does not need to understand the resilience approach used, instead the rated capacity of the device group at the node, the number of active devices and the device capacity are sufficient.

Modular Facilities

The number, presence or capacity of devices in the data centre and capacity of the overall data centre may vary with time in the simulator to allow for simulation of modular deployment, removal, migration or replacement of IT, Electrical or Mechanical capacity through the operational lifetime of the building.

Fixed Energy Overhead

The simulator is able to determine the fixed energy consumption overhead of a data centre at any point in time, taking into account external environmental conditions, the configuration and deployment state of the data centre infrastructure and operational management.

This is not possible in an operating facility without substantial disruption to service. The fixed overhead may only otherwise be approximated by regression analysis of energy data which does not provide causal analysis or predictive capability. (See Data centre energy efficiency metrics by Liam Newcombe, a BCS published white paper available at http://www.bcs.org/upload/pdfdata-centre-energy.pdf)

IT Simulation Overview

A second mode of the data centre simulator is to perform an IT simulation. Once a data centre scenario has been created the simulator is able to put IT devices into that data centre and simulate the energy and cost impacts of operating those devices across a specified time period. The output of this simulation is a set of energy and cost data representing the IT device and data centre energy consumption, capital and operational costs.

Whilst there are a number work streams aimed at building on infrastructure level reporting metrics such as DCIE and creating horizontal metrics that describe the overall 'efficiency' of IT equipment or the data centre system this is not the approach taken by the simulator. Just as at the data centre infrastructure level, metrics that report the entire data centre do not provide the analysis capability to support change impact assessment or business case generation and cannot support useful or credible chargeback mechanisms.

The key difference in approach is that the simulator is able to take all of the variables that impact the energy use and cost of IT devices in the data centre and provide a vertical view through the IT equipment and data centre stack to provide allocation of the energy use and cost of the IT devices under examination.

Overview of IT Simulation

Figure 13:
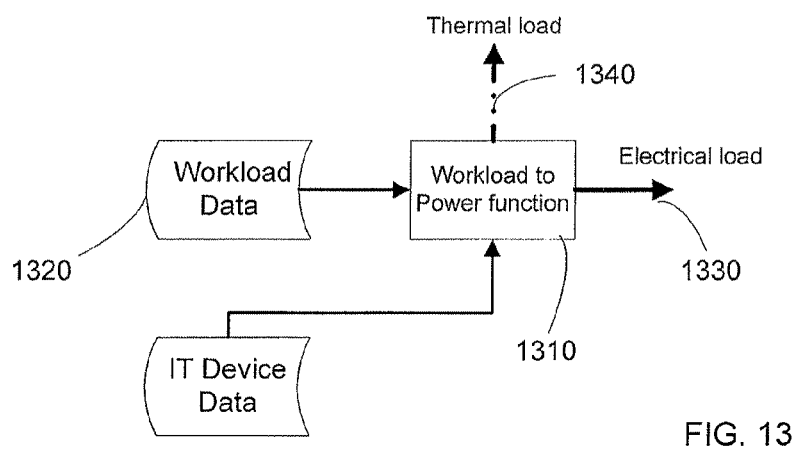
FIG. 13 is a model of an IT device used in the simulation of an embodiment of the invention.

The simulation of an IT device is conceptually simple; an application workload 1320 is applied by the simulator to a node 1310 which represents the IT device(s) being simulated. This node 1310 has the application load to power draw function for the IT device(s) under simulation and converts the applied workload into a power draw 1330 and heat output 1340, as illustrated in FIG. 13.

This power draw and heat output are then applied to the simulated data centre infrastructure to determine the actual energy use and cost at the data centre supply of the applied workload on the IT device(s).

IT Device Workload to Power and Efficiency

Figure 14:
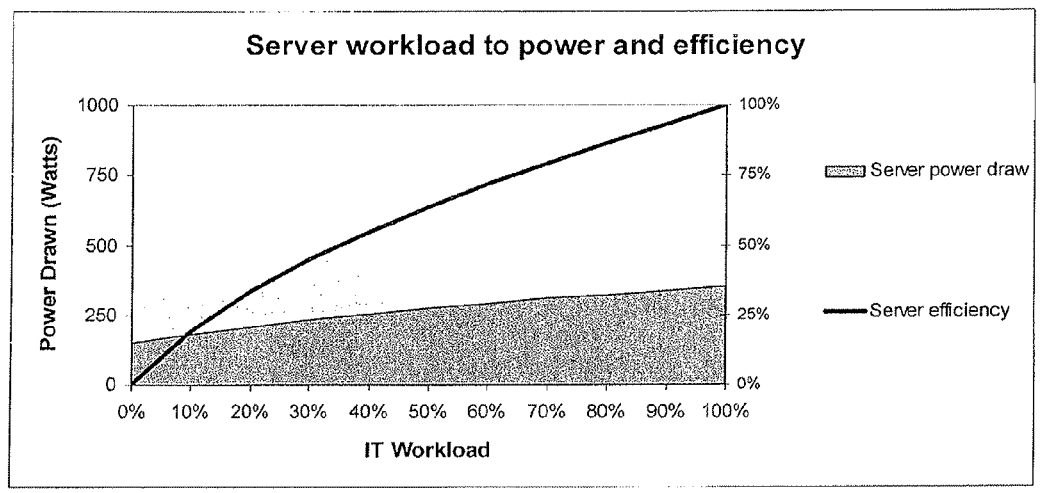
FIG. 14 shows the relationship between server workload, server power draw (solid block) and server efficiency (line)

One key point is that IT devices rarely exhibit constant power efficiency with workload. Much like the data centre infrastructure, the achieved efficiency in terms of IT workload by power consumption falls as the IT workload falls as shown in FIG. 14.

This relationship demonstrates that it is not useful to express the efficiency of groups of IT devices in a data centre without considering the applied workload on each of those groups and the resulting efficiency. The complexity of this evaluation is compounded by the response of the data centre to IT electrical loads.

Electrical Load Context

As shown in the discussion above, the response of the data centre to IT electrical load is not linear, therefore before we can simulate the impact upon the data centre of a specific IT device or group of devices it is necessary to apply the full electrical and thermal load of the other IT equipment in the data centre.

Figure 15:
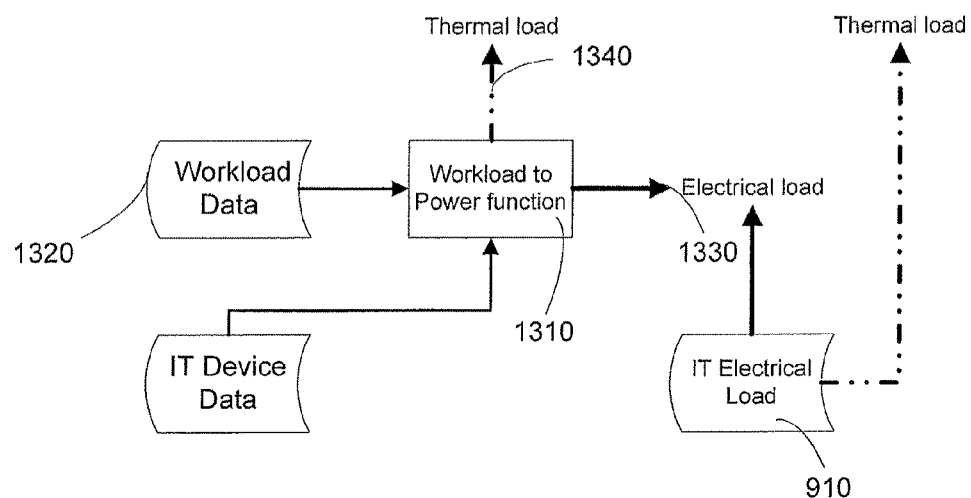
FIG. 15 illustrates the manner in which the simulation models IT electrical load other than the IT device(s) being analysed, in order that the IT device is analysed in an operational context.
Figure 16:
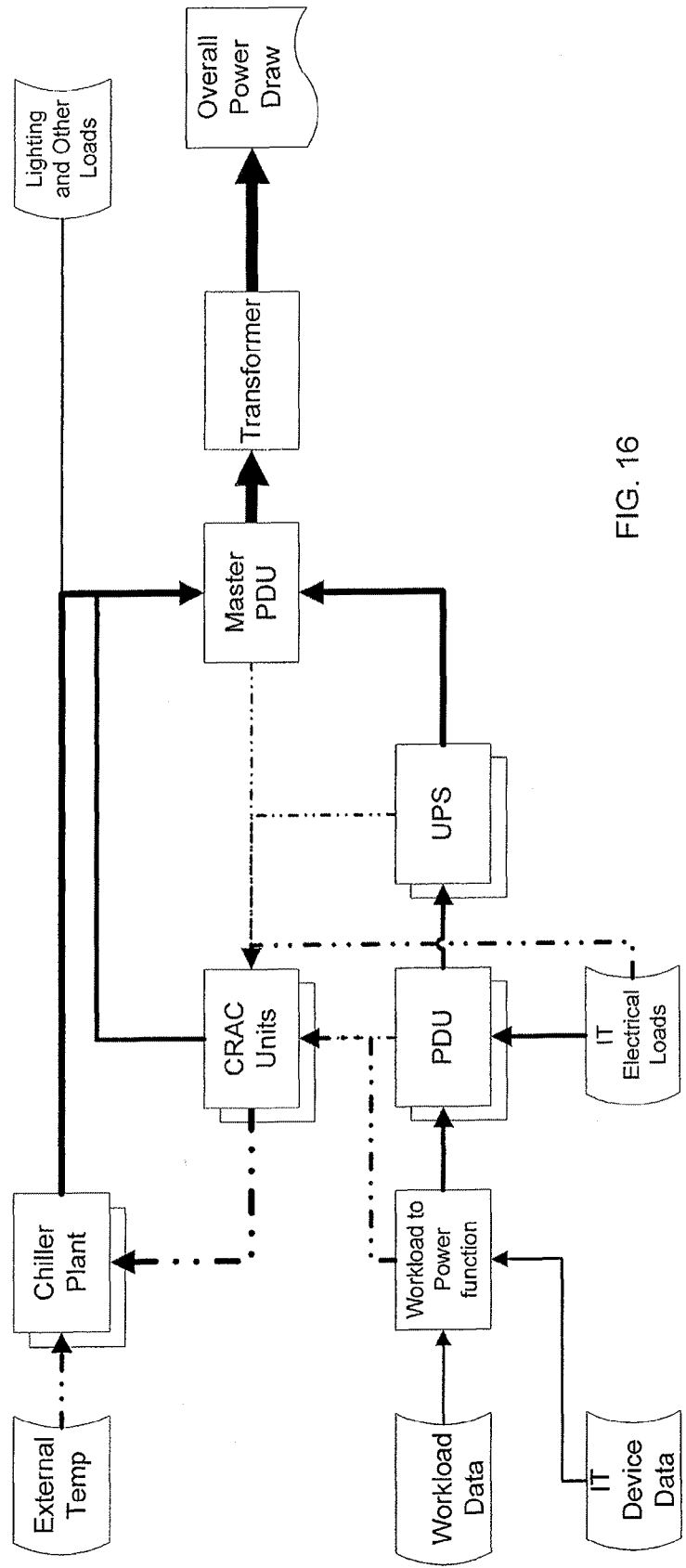
FIG. 16 illustrates the integration of the IT device and IT electrical model of FIG. 15 into the model of the combined power and thermal chains of FIG. 11.

This is achieved in the simulator by using the IT Electrical Load node 910 that was used in the DCIE simulation to apply electrical and thermal load to the data centre (FIG. 15).

IT Device and IT Electrical Load Applied to the Data Centre

The simulator nodes for the IT device and the IT electrical load are connected to the power and thermal simulation chains already established for data centre simulation as shown in 16.

Allocation of Energy

A key part of the operation of the simulator is the allocation mechanism developed to effectively represent the data centre.

Current approaches to energy accounting and 'charge back metrics' are simplistic and frequently ineffective. These approaches typically use either:

The power (energy) consumption of a device; and

The space or power and cooling capacity allocated to a device, rack, area or room as proxies for the device energy consumption and cost.

These are ineffective and create perverse incentives driving sub optimal behaviour. This failure to effectively understand and represent costs can have significant impacts upon the overall performance of a data centre, either wholly owned or service provider.

The simulator is able to determine the share of both load and allocated capacity at each node in the chain, allowing for much more effective cost allocation than the simplistic approaches currently in use. For example if a server is allocated 100 W and is fed by an Uninterruptible Power Supply with 10% losses, this allocation may become 110 W at the main Transformer feeding the server. The same loss factoring takes place for drawn power.

This system level analysis of allocation and consumption allows for far greater detail and accuracy in the allocation of costs than traditional methods.

A core concept of the simulator is that it understands and implements both fixed and variable costs (energy and financial) and how these are incurred by logical or physical devices within the data centre. Fixed energy consumption and financial costs such as amortised capital and fixed energy consumption are allocated to devices based upon their allocation of data centre resources. Variable energy consumption and financial costs such as energy consumption are allocated to devices based upon their consumption of resources.

The data centre simulator has established and implemented a set of basic rules to allocate a fair and reasonable share of the data centre energy consumption to the simulated IT devices[8]. One basic tenet of these rules is to accrue fixed and variable loads and costs separately. These fixed and proportional energy and financial costs for the data centre are directly analogous to the normal finance concepts of fixed and variable cost and we will use them in a similar way to understand the real energy and cost behaviour of the data centre and how that impacts the cost and energy use of operating IT equipment within the data centre.

[8] See the BCS whitepaper "Data centre energy efficiency metrics" for a more detailed exploration of fixed and variable energy and cost allocation, http://www.bcs.org/datacentreenergy, the content of which is incorporated herein by reference.

Fixed and Variable

Simulation of the data centre infrastructure has demonstrated the impact on efficiency of the fixed load that the data centre exhibits at any combination of external temperature and infrastructure deployment. This fixed overhead means that metering all of the IT devices and applying a ratio of the IT power to the overall facility power fails to properly factor this fixed energy cost and is not useful as an allocation mechanism or chargeback metric.

In allocating the cost of an office building the rental and service cost of a desk space would be accrued irrespective of whether the employee used the desk or what work they performed, this is a share of the fixed cost. The variable costs might include the energy used by a desktop PC and the telephone bill incurred by the employee whilst working at the desk.

In a data centre when an IT device is installed, power and cooling capacity is allocated to that device. In most data centres, once this capacity is provisioned it cannot be used for another device. Once all of the available capacity of the data centre is allocated no more IT devices can be installed. The simulator uses this provisioned power to determine the share of the data centre fixed energy use that should be allocated to that IT device. This is carried out at every step of the simulation, taking into account the full state of the data centre and external temperature.

The simulator is also able to determine the marginal energy use of the data centre due to the IT device energy use, this comprises both the energy used by the IT device itself and the additional energy used by both the power and thermal infrastructure to deliver that power to the device and remove the resulting heat. As before, this includes iteration of loops such as UPS fed CRAC units.

Figure 17:
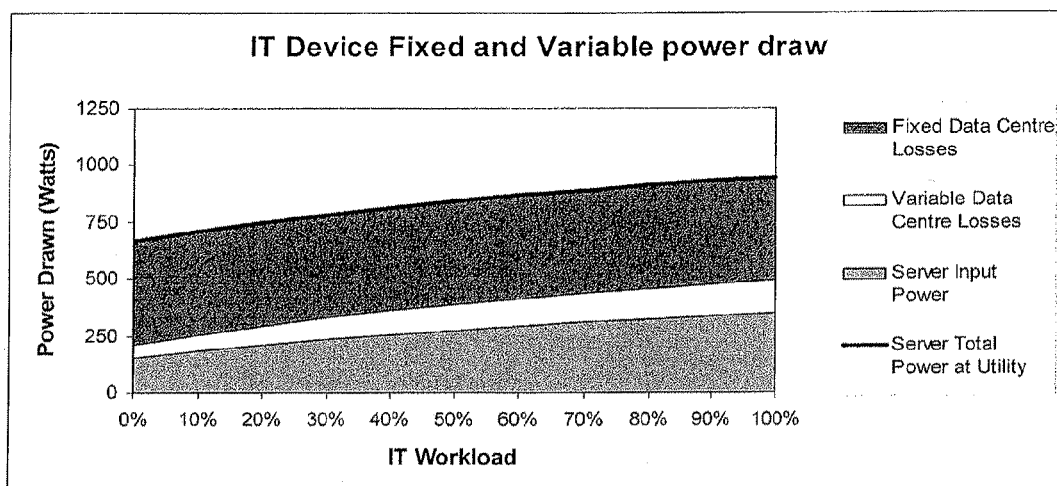
FIG. 17 is a plot of IT device fixed and variable power drawn against IT workload.

As illustrated in FIG. 17, a sum of the fixed and variable power draw provides a fair and reasonable representation of the total energy cost of the IT device in the data centre.

Figure 18:
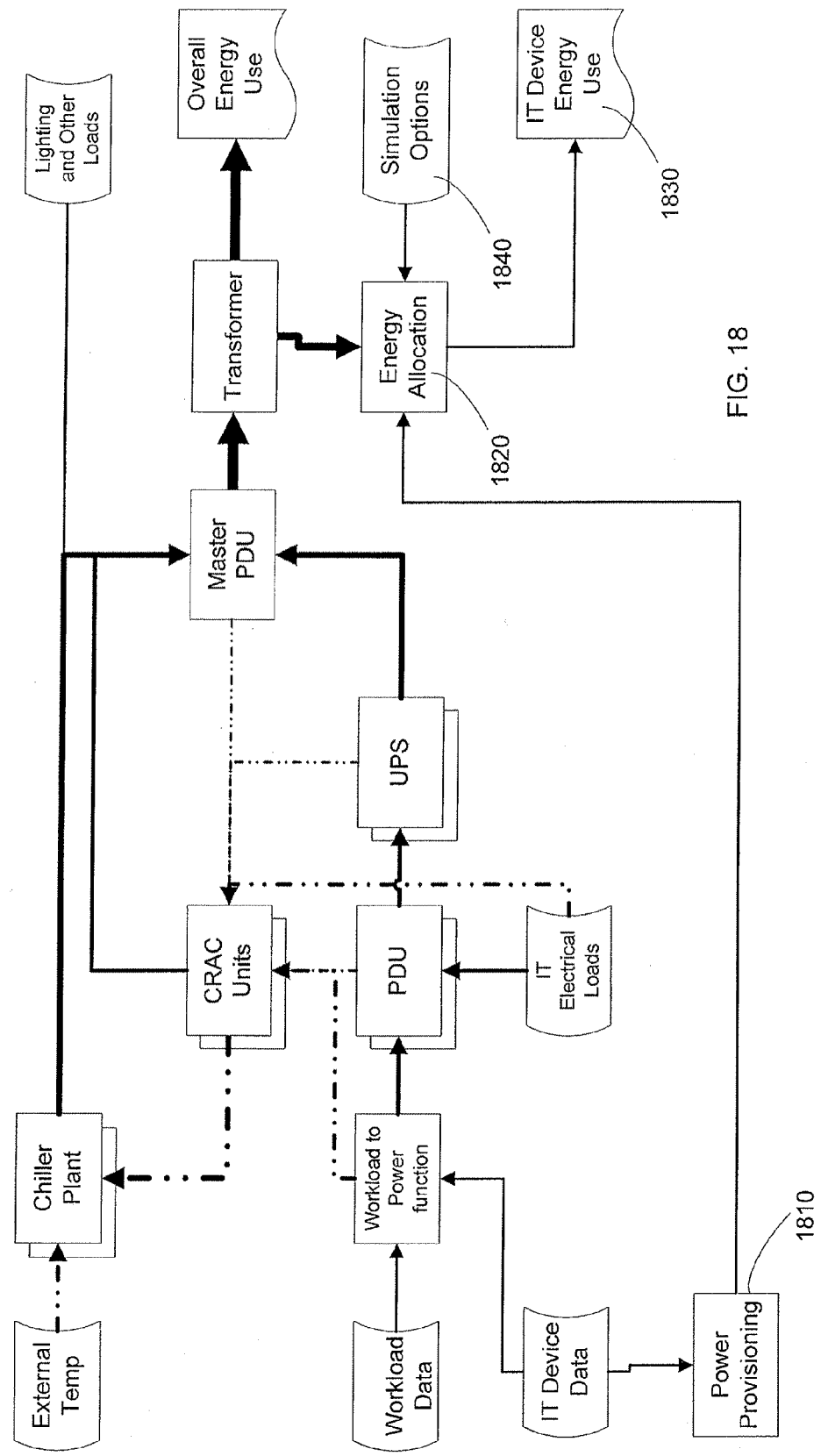
FIG. 18 shows the simulation model of FIG. 16 with additional nodes and connections to enable IT device fixed and variable energy allocation.

FIG. 18 shows additional nodes in the simulator to analyse power provisioning and energy allocation to determine IT device energy usage, based on the chosen simulation options. These additional nodes are a power provisioning node 1810 and an energy allocation node 1820 that calculate an IT device energy use 1830 for given simulation options 1840.

Cost Allocation

To provide useful output the data centre simulator reports both energy consumption and cost for each scenario. To determine the cost of each scenario the simulator includes the capital and maintenance cost of the IT device(s), the capital cost of the data centre facility and the cost of energy supplied to the data centre.

Figure 19:
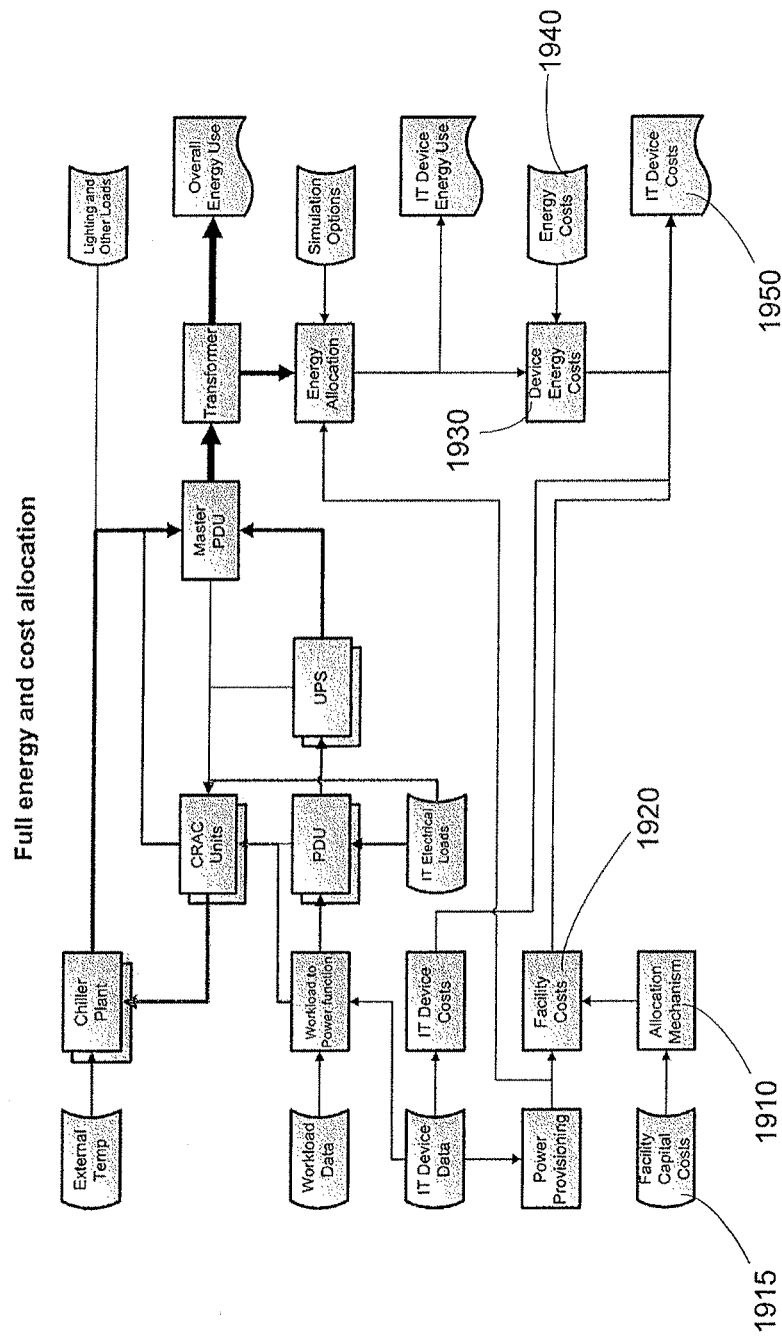
FIG. 19 shows the simulation model of FIG. 18 with additional nodes and connections to enable full energy and cost allocation.

FIG. 19 shows a further development of the simulator structure to include nodes to calculate an allocation of the energy and facility costs to give the IT device costs. Specifically, an allocation mechanism node 1910 (which has an input of facility capital costs 1915) and facility costs node 1920, in combination with a device energy costs node 1930 (which has an energy costs input 1940), are used to calculate IT device costs 1950.

The simulator is able to model the costs of the data centre in substantial detail using the same basic structure of nodes, connections and performance data as in the energy analysis. This includes repeated accrual of partial costs where feedback loops exist.

The simulator is able to ensure that all injected cost is allocated and accounted for.

Arbitrary expressions of capital and operational cost characteristics may be applied to any node in the data centre; these may be related to the configuration of the device or the applied loads.

The simulator is able to accrue costs to each node or applied load through the simulated system thus providing detailed and accurate analysis of the cost of delivering all or part of the data centre service.

IT Device Cost

The capital cost and annual maintenance cost of the IT device are entered as parameters of the scenario. The capital costs are amortised over the specified device lifetime or write-down period whilst the maintenance costs are accrued throughout the duration of the scenario at their frequency of occurrence.

Facility Capital Costs

The capital cost of the data centre mechanical and electrical plant is represented as a cost per Watt of data centre infrastructure. This is amortised over the stated design lifetime or write-down period of the device to provide a time sensitive cost per Watt of infrastructure and then accrued through simulation time based on the power provisioned to the IT devices.

Facility Space Costs

The capital cost of the remainder of the data centre building may be represented as a cost per unit of usable IT space. This may then be amortised over the stated design lifetime or write-down period of the device to provide a time sensitive cost per unit space of building and then accrued through simulation time based on the space provisioned to the IT devices.

Energy Costs

Energy cost data is used hourly with the device and total energy data to provide energy cost output for the device and the overall facility.

Compensating for Utilisation

The simulator is able to vary the allocation and accrual of energy and cost to a device based upon the accounting preferences of the user and the level of utilisation of the data centre. For example, if the amortised capital cost of the data centre infrastructure is £0.10 per Watt month and a server is allocated 1 kW then it would accrue £100 per month in amortised infrastructure cost. If the data centre capacity is only 50% allocated, i.e. it is half empty, this may still be a valid allocation for the user accompanied by 50% of the amortised capital cost shown as unallocated. Alternatively the simulator can compensate for the utilisation of data centre capacity at that point in time, at 50% the server would accrue £200 for that month.

More specifically, the simulator is able to allocate the IT device energy and costs in the manner described above.

Figure 20:
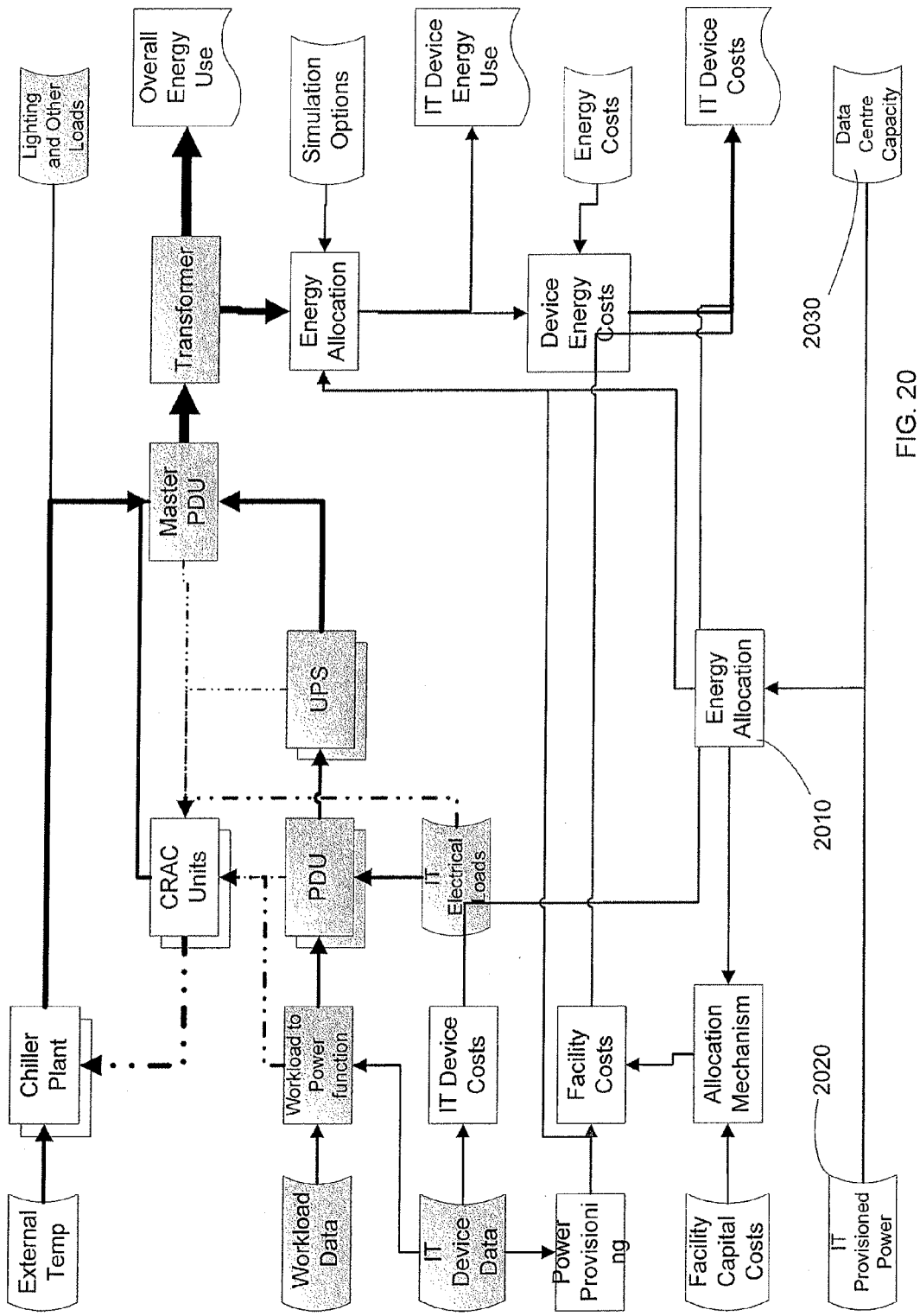
FIG. 20 shows the simulation model of FIG. 19 with additional nodes and connections to enable full energy cost allocation with utilisation compensation.

Additional node(s), such as the energy allocation node 2010 illustrated in FIG. 20, can be implemented in the simulator to manage this mode of cost allocation, based on inputs of IT provisioned power 2020 and data centre capacity 2030.

Time in IT Simulations

Whilst the data centre simulations step through a range of applied electrical loads and external temperatures the IT simulation steps through time. This allows the simulator to ensure that the correct value(s) for each of the external variables is applied to each time step. This allows the simulator to provide useful analysis of the impact of devices such as cooling economisers which are most likely to be working overnight when the IT workload and thus power draw may be low and the cost of power at its minimum, conversely, in the middle of the day where external temperature is highest, IT workload and power draw highest and the cost of power high the economiser may not be providing any benefit.

Time Steps

The basic units of time used within the simulator are the day and hour, the simulator by default steps through 24 hours for each day, using the appropriate values from the supplied data and evaluates the state of the data centre, energy consumption and cost for the hour. The costs and energy consumption of the hours are summed to provide a set of daily values.

Simulation Months

The default units of time for a simulation are months; the simulator will simulate one full day of each specified type for each month of the simulation and multiply the values to achieve a total cost for the month. Multiple types of day may be specified, for example to account for variability in user workload between weekdays and weekends.

Time Variant Data

To iterate successfully through a simulation the simulator requires data which is time variant:

TABLE 3

| Time variant data | | |
|---|---|---|
| Data Type | Varies Monthly | Varies Hourly |
| External Temperature | Yes | Yes |
| Power Cost | Yes | Yes |
| Total data centre capacity | Yes | |
| M&E device provisioning | Yes | |
| Lighting and Other loads | Yes | Yes |
| IT provisioned power | Yes | |
| IT workload | Yes | Yes |
| Other IT electrical load | Yes | Yes |

Software Structure

Embodiments of the simulator are implemented in software executable, for example, on a general purpose computer. In some embodiments, the software is executed on a server computer accessible remotely over a network via a browser interface. For example, the simulator may execute on a server accessible from a client device over the Internet from using an Internet browser application installed on the client device.

Figure 21:
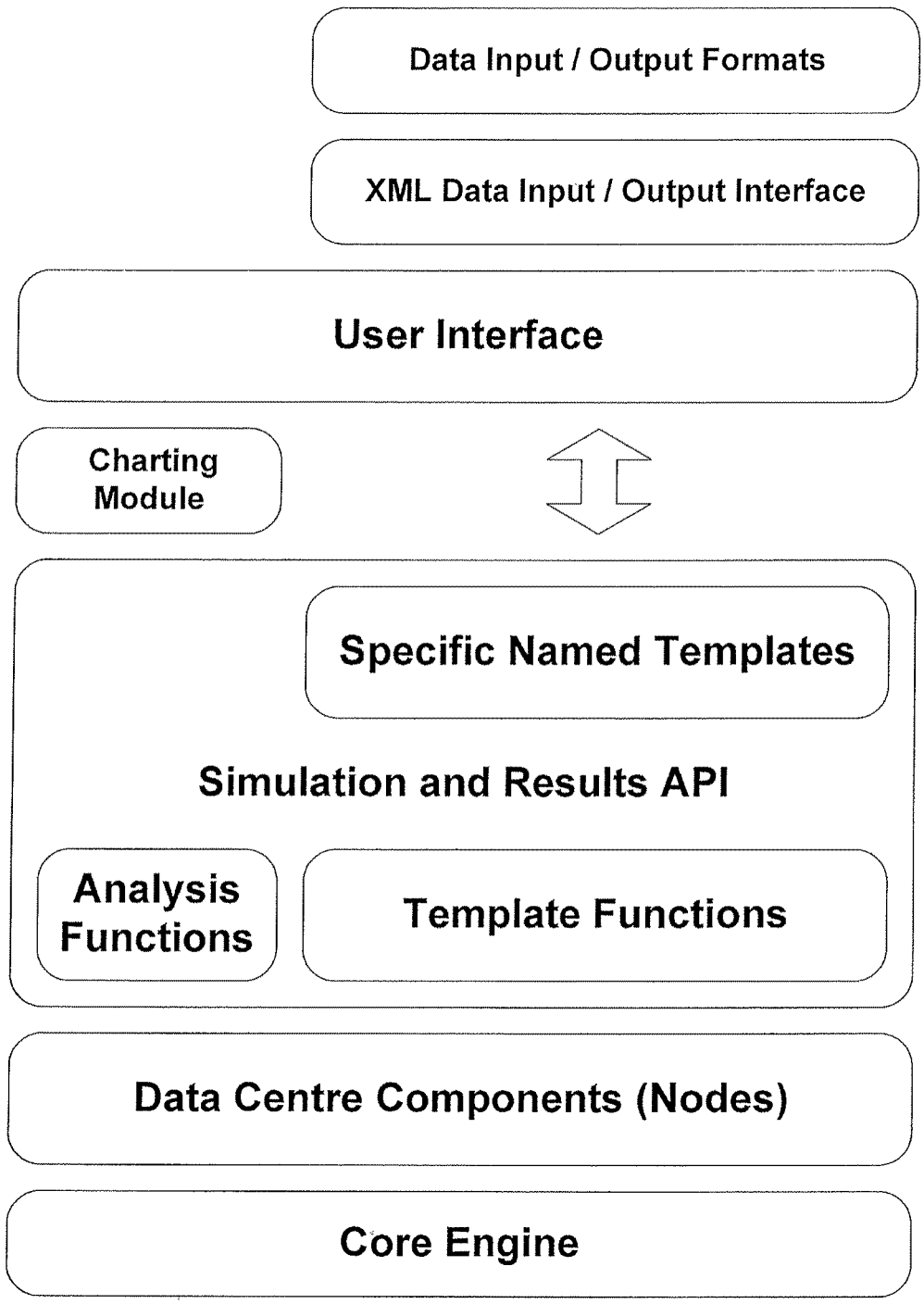
FIG. 21 is a schematic illustration of the software structure of an embodiment of the simulator.

The software structure of an embodiment is described below, with reference to FIGS. 21 and 22.

The software can be broadly broken down into five major components, the core simulator, the data formats, the charting module, the Web user interface and an alternative user access interface.

User Interface

A web user interface may be used to enable use of the tool without the need to download and install software onto a user machine. This UI also provides a mechanism for users to report an implemented carbon saving by reporting the two scenarios describing the saving and the assistance provided by the tool.

Charting Module

To provide more visually compelling graphs of the output data from the simulator from the web user interface a charting module is used to provide the characteristic stacked bar charts and surface plot representations of the data (as seen in FIGS. 5 and 23 to 26 for example).

Data Input/Output

The simulator uses a set of data formats for input and output. There is a relatively small set of data formats which describe the specific performance of each device to the simulator node representing each device, a format for simulation output and a format for description of the data centre layout. These are provided to the simulator as XML schemas as this is a broadly recognised platform independent and portable standard.

XML Interface

The XML data formats are supported by input/output interfaces and interpreters.

Simulator

Core Engine

The Open Source Core Engine is the underlying environment which allows the simulation. This implements the functional environment within which the data centre component nodes operate.

Data Centre Components

The Data Centre Components are a set of nodes which represent the individual data centre components in the simulation.

Simulation and Results API

The Simulation and Results API provides the ability to set up, execute and collect the results of a simulation. The Template Functions assist in establishing the simulation model, the Analysis Functions iterate through the parameters of the simulation, varying external variables such as workload and ambient temperature and collating the results.

Figure 22:
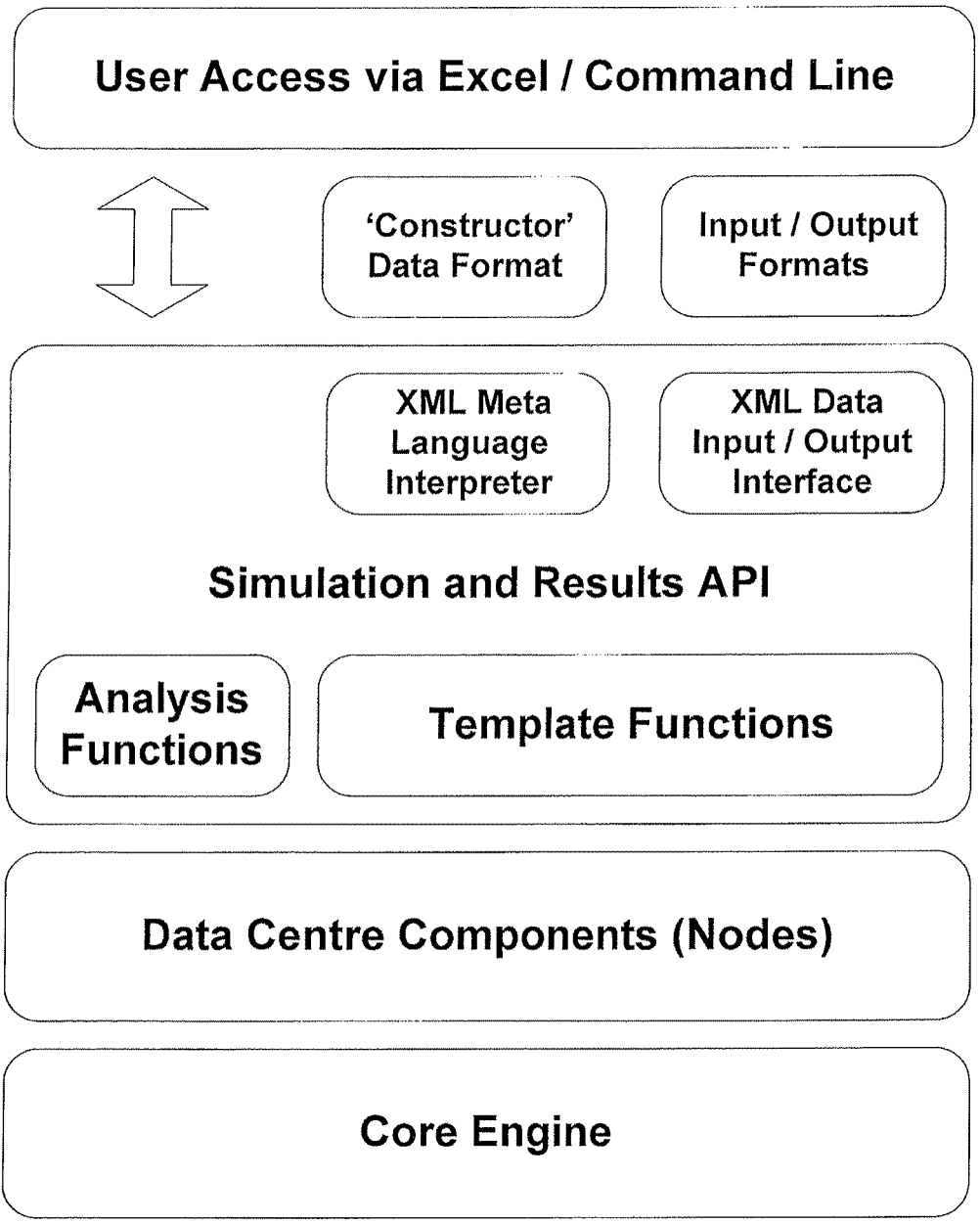
FIG. 22 is a schematic illustration of the software structure of another embodiment of the simulator.

Alternative User Interface (FIG. 22)

As an alternative to the web UI, but still enableing users to interact with and receive results from the simulator in an effective and predictable manner, an XML interface may be provided to take the place of the calls made by the web UI.

Data Input/Output

A full set of data input and output XML formats can be made available. This can take the place, for example, of form entered data in the Web UI. The input/output interface is expanded from the web UI version to handle all of these formats. It may be a superset of the web UI capability.

Constructor Data

The data centre logical layout within the simulation is represented by a constructor. This carries the information required to create and connect the Data Centre Components within the Core Engine for simulation. This is a complex process which is supported by a specific XML data format representing the layout. This data format is interpreted by the XML Meta Language Interpreter. The simulator can employ a simplified logical layout of the facility (i.e. not incorporating the full complexity of the complete M&E installation). Indeed, the simulation can be implemented with anything from a single node to every component of the data centre dependent on the requirements for the simulation.

Applications of the Simulator

The simulator can be put to use in many and various applications, some examples of which will already be apparent from the discussion above. Some other possible applications are noted below.

Determining Energy and Cost Impact of Logical Devices

The simulator is capable, through system level simulation, of determining the energy or cost impact of logical devices in the data centre as well as physical.

For example, it is not possible to install a power meter for a virtual server but it is possible to simulate the load on the physical server to determine the impact of the virtual server and thus the accrued impact at data centre level.

What If Analysis

The simulator is able to perform a very broad range of 'what if' analysis.

Output data from such 'what if' simulations can be used to determine:

Likely returns on capital investments;

Service delivery costs and their relation to service revenue;

Sensitivity to external factors such as energy cost; and

Optimal strategies for capacity build out and customer pricing.

System Level Analysis of Capacity

The simulator is able to effectively load test data centre designs before or after construction to validate the provisioned and actual device capacity of the data centre under a range of operational modes including degraded operating modes testing system redundancy.

This can be used to analyse both worst case scenarios and to provide capacity curves against other variables for the data centre. A facility may well be able to support a greater IT electrical load at a lower external temperature than its design rating. Dependent upon the operational approach it may be appropriate for the operator to exploit this capacity.

Operational Decision Support

The simulator is well suited to operational decision support in situations such as:

Whether to shut down plant equipment whose capacity is not currently required;

Where and when to place a devices or workload in a data centre or group of data centres; and What price(s) to accept for services dependent upon the marginal cost of delivery.

Billing

The level of analysis provided by the simulator allows for effective allocation and charge back of workload, device, device group, area or whole data centre costs.

Multi Party Analysis

The simulator facilitates the analysis of data centre energy and cost performance with masking of detailed data where there are multiple parties involved. For example, a data centre operator providing service to an IT equipment operator. In this case the simulator could be used to determine the financial cost and revenue to the data centre operator whilst only showing the IT equipment operator the revenue and allocated utility energy for carbon accounting purposes.

Early Stage Evaluation of Technology or Products

The simulator can been used to evaluate early stage technology at a pre prototype phase. A number of technology development scenarios can be tested against a number of operating data centre scenarios to assess the overall benefits available from the technology. This allows for substantial time and cost acceleration of the technology through the disposal of options which had been considered to be promising prior to systems level analysis.

Scenario Comparison

Having created a data centre and executed an IT simulation within that data centre the simulator can be used to perform scenario comparison.

One example of such a comparison, to illustrate the principle, is a pre/post virtualisation comparison. When virtualising there is frequently a requirement to forecast the business case to justify the change in policy or the capital cost. This can be difficult as the consolidation ratio is not an effective proxy for the cost saving due to:

Increased capital cost of the higher spec servers used for virtualisation;

Higher per server power consumption of the higher spec servers;

Higher per server power consumption of the servers due to higher workloads, particularly when comparing new, Energy Star compliant devices;

Higher per server amortised capital cost of the data centre power and cooling infrastructure;

Possible changes in utility power cost; and

Possible changes in utilisation of the data centre.

The data centre simulator is able to take all of these variables into account and provide an effective forecast of the benefits of a virtualisation program.

The first step in the comparison is to create a pre virtualisation scenario as a baseline for comparison. In this example the company plans to deploy a further 100 commodity 1U servers under the existing one application per server policy. The comparison will be over a 4 year period.

Figure 23:
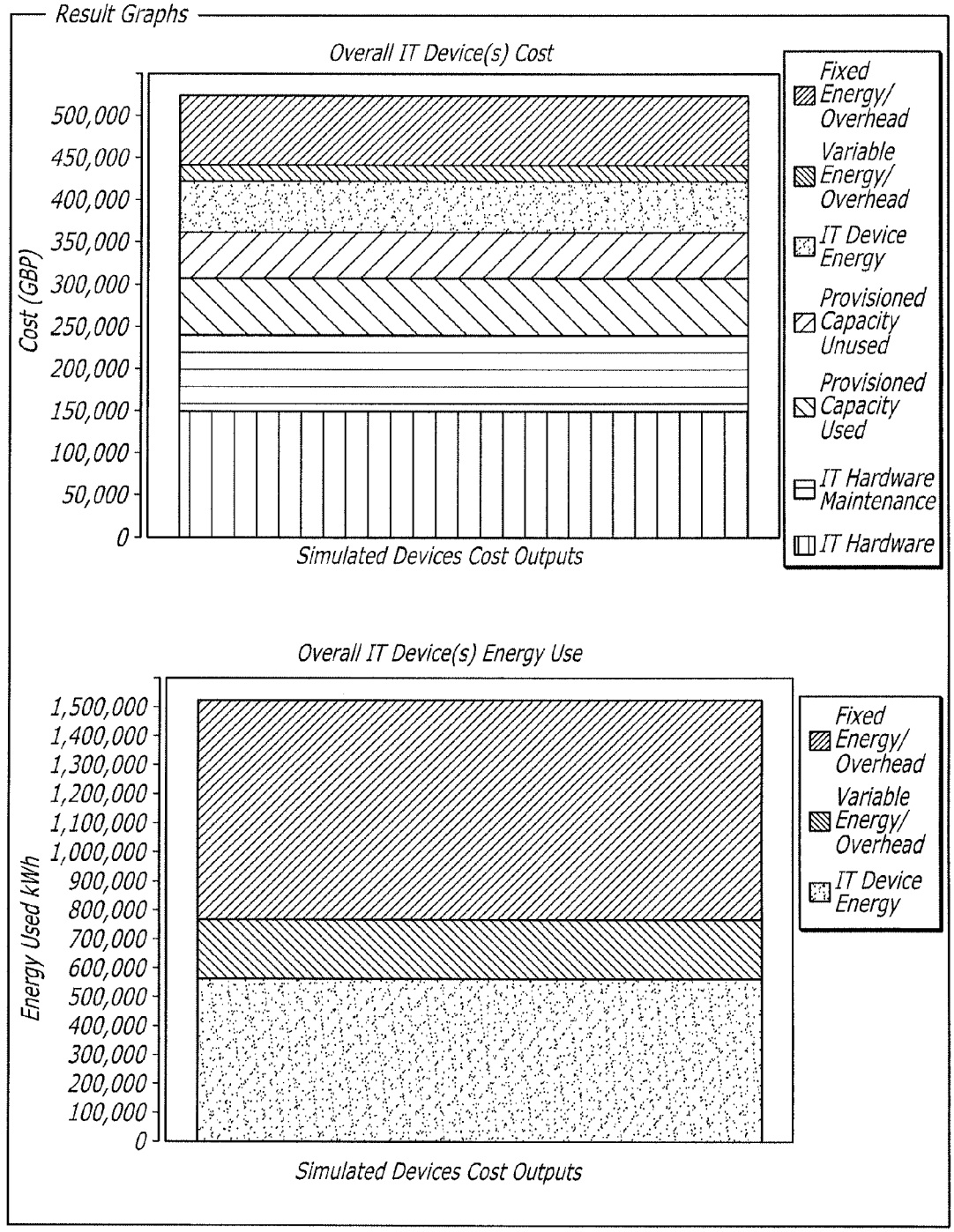
FIGS. 23 to 25 are plots of overall IT device cost and energy use for two comparative scenarios.

The simulation can then be run and the cost and energy outputs for the 4 year simulation viewed. FIG. 23 shows exemplary results.

The next step is to create the post virtualisation scenario for comparison of cost and energy. Our consolidation will be from the 100 commodity 1U servers down to 15 commodity 4U servers which are of higher specification and cost.

Figure 24:
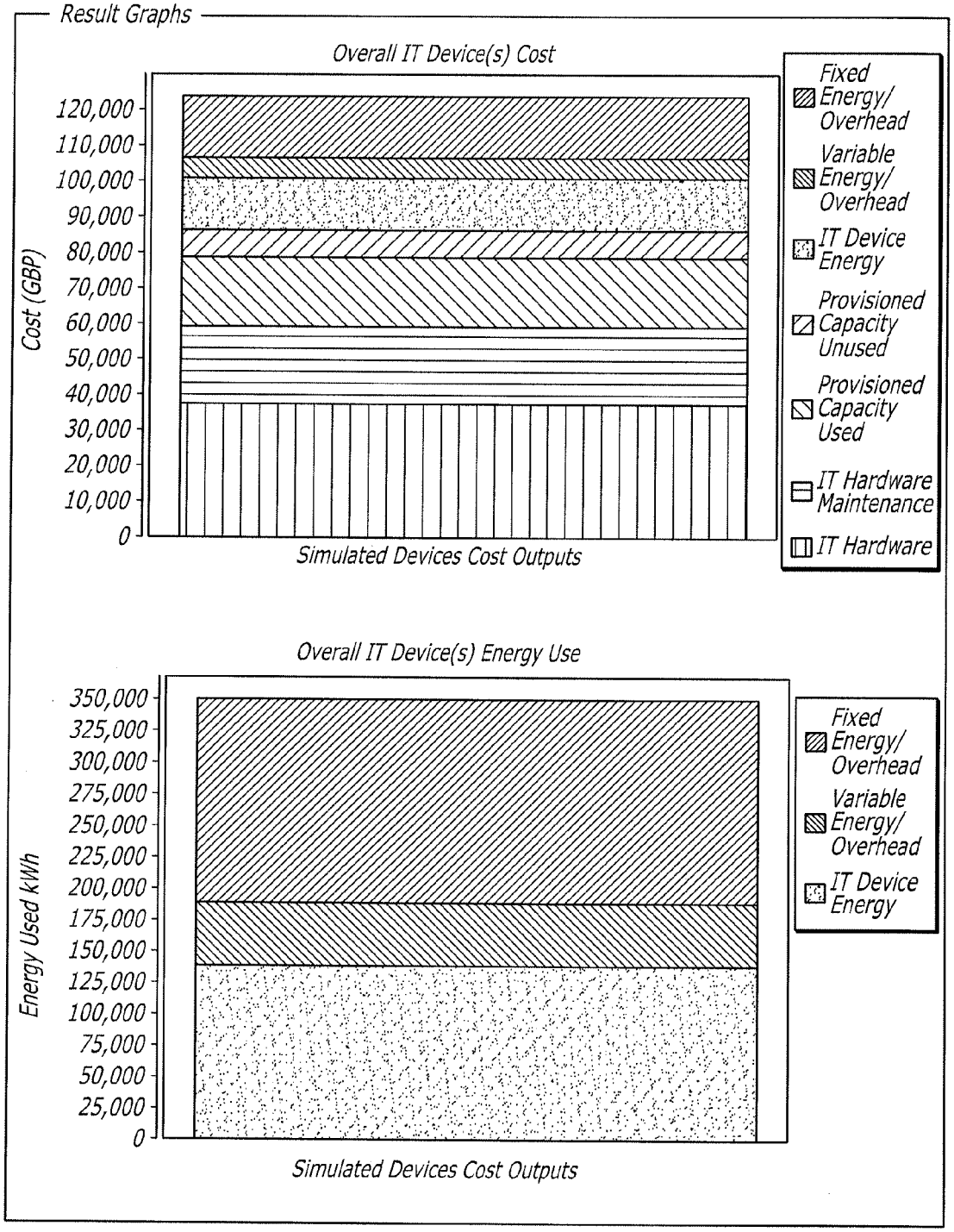

The simulation can then be run again and the cost and energy outputs for the 4 year simulation, this time based on the post virtualisation scenario viewed. FIG. 24 shows exemplary results.

The substantial reduction in overall cost and energy consumption is clear from comparison of the pre virtualisation graphs in FIG. 23 with the post virtualisation results in FIG. 24.

Figure 25:
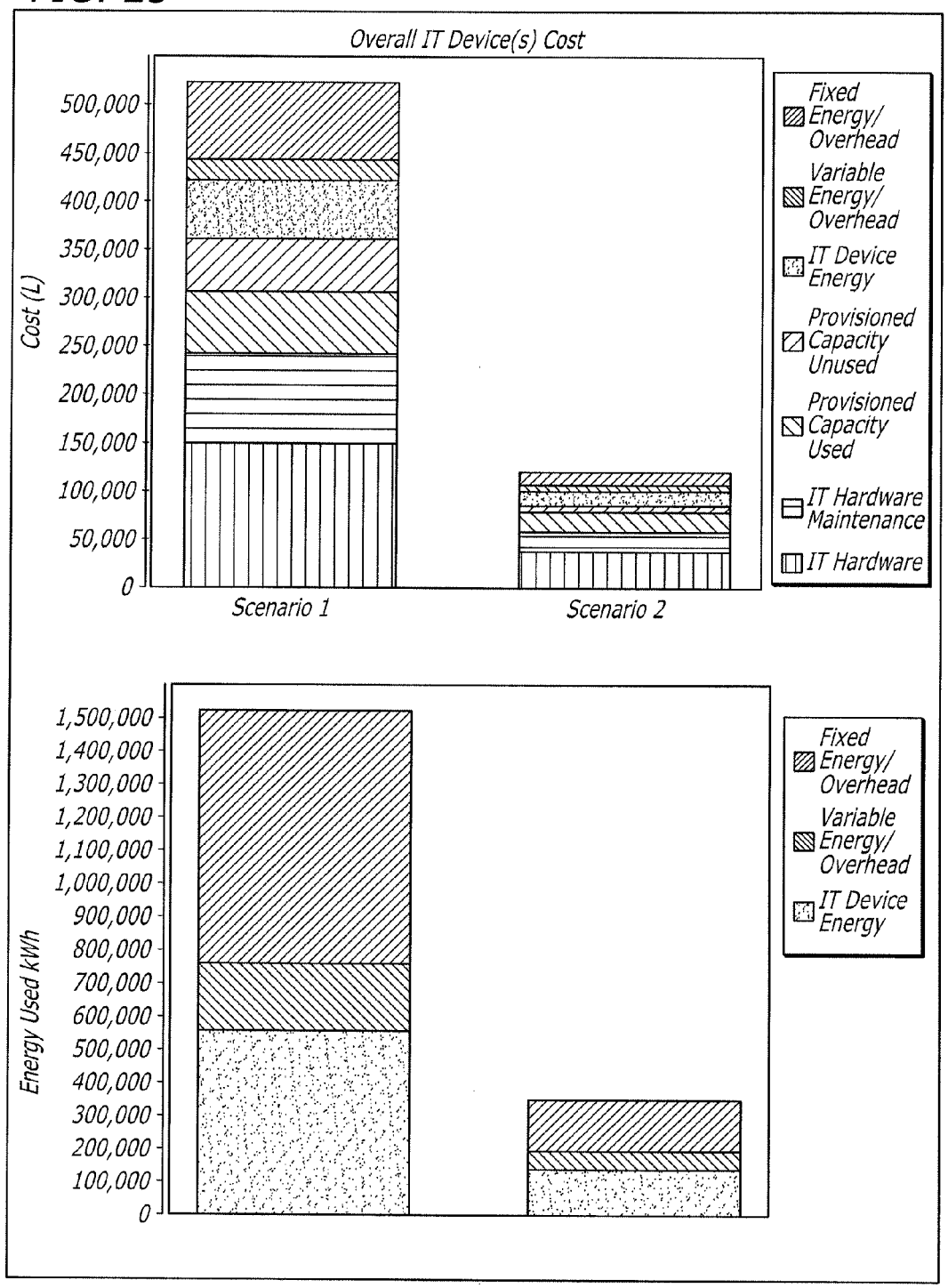

While it is clear that the post virtualisation scenario offers savings compared to the pre virtualisation scenario it is useful to be able to directly compare the cost and energy consumption of the two scenarios. FIG. 25 shows a side by side comparison of the overall IT device(s) cost and energy use. This comparison shows more directly the difference in the scenario output graphs.

The comparisons described so far have been the energy and cost allocated to the IT device. However, a key comparison for the creation of a business case is the impact on the overall energy use and cost of the data centre.

Figure 26:
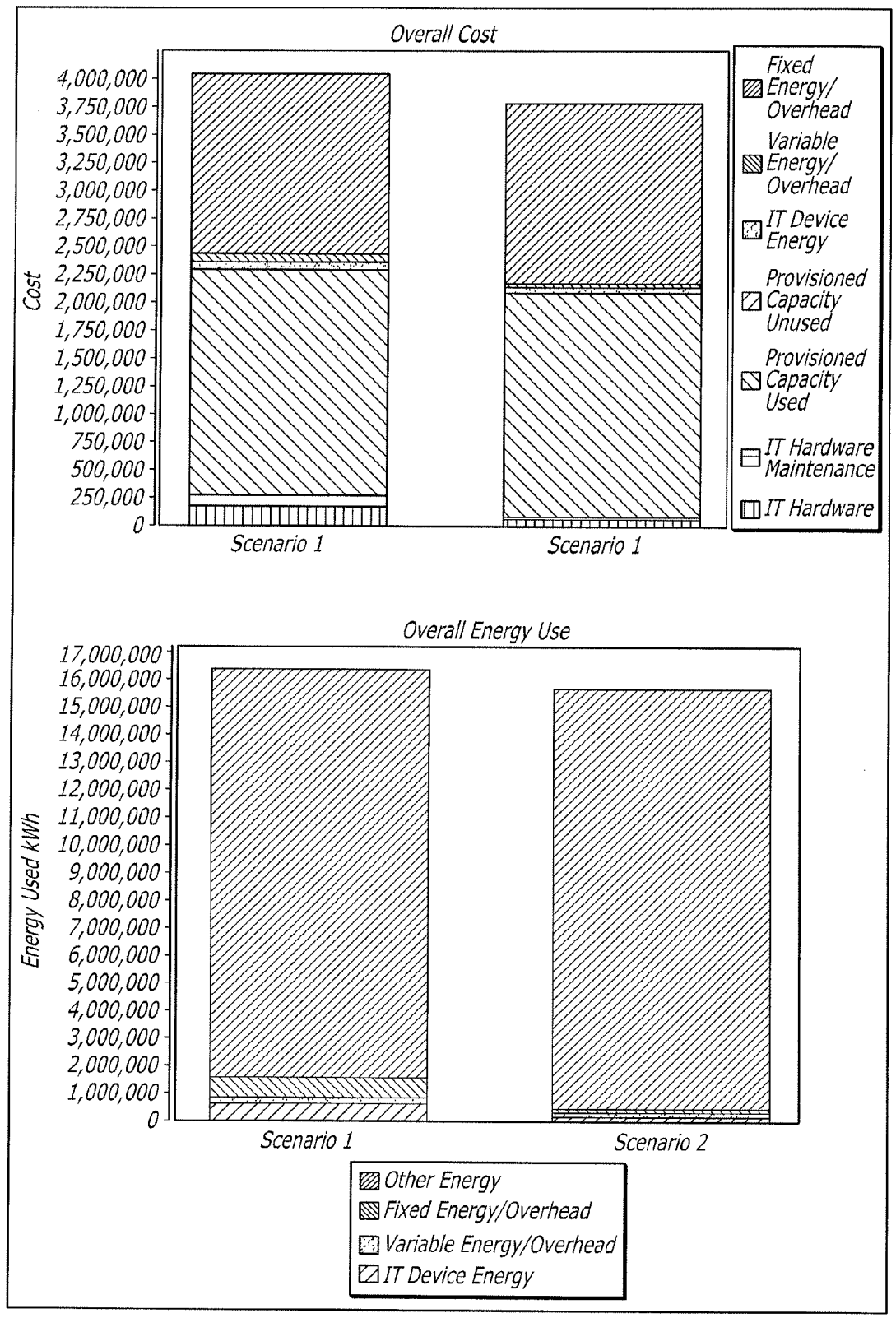
FIG. 26 is a comparative plot of overall (data centre) cost and energy usage for the two scenarios.

The graphs in FIG. 26 shows the overall costs and energy use of the whole data centre over the simulation period. The Amortised Data Centre Capital Cost is the full amortised cost for the facility rather than the part allocated to the IT devices. The Other Energy segment on the bar chart represents all of the data centre energy use not allocated to the simulated IT devices.

While the invention has been described in conjunction with exemplary embodiments, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

What is claimed:

1. A computer simulation system for simulating a data centre, the simulation system comprising:
    a server;
    a logical representation of the data centre including:
        a plurality of nodes representing devices in the data centre, said plurality of nodes comprising at least one node representing one or more IT devices, at least one node representing an element of an electrical power delivery infrastructure of the data centre, and at least one node representing an element of a mechanical heat removal infrastructure of the data centre, each node comprising:
            a first input for applied load;
            a first output for total load from the node;
            a second output for losses;
            a function for calculating the outputs from the inputs;
        a first plurality of connections between at least some of the nodes, each of said first plurality of connections connecting an output of one node to the first input of another node and representing electrical power drawn by one device in the data centre from another device in the data centre;
        a second plurality of connections between at least some of the nodes, each of said second plurality of connections connecting an output of one node to the first input of another node and representing a thermal load applied by one device in the data centre to another device in the data centre; and
    a simulator framework operable to run a simulation by sequentially applying a series of input states to the simulator and recording an output of the simulator after the application of each input state;
    wherein the simulator output determines an allocation or attribution of a share of overall data centre energy to each individual node, and wherein the simulator output allocates a cost individually to each node that includes energy, capital, and operational costs, wherein capital costs include capital costs of hardware and installation, and wherein operational costs include operational costs of the infrastructure of the data centre and maintenance costs of hardware based upon a utilised or allocated portion of capacity.

2. The system of claim 1, wherein each input in the series of inputs comprises an applied electrical load and an external temperature and the simulator output comprises a data centre efficiency value.

3. The system of claim 1, wherein each input in the series of inputs comprises a time.

4. The system of claim 1, wherein each input in the series of inputs comprises operating data for at least some of the nodes, at least some of the nodes each comprising at least one additional input for operating data.

5. The system of claim 4, wherein said operating data comprises performance data for the device represented by the node.

6. The system of claim 4, wherein said operating data comprises data representing at least one environmental parameter.

7. The system of claim 1, wherein the simulator output comprises an allocation of the data centre energy consumption to each of the nodes.

8. The system of claim 1, wherein the cost allocated to a node includes a cost accrued to the capital cost of hardware and installation.

9. The system of claim 1, wherein the cost allocated to a node includes a cost accrued to the maintenance cost of hardware.

10. The system of claim 1, wherein the cost allocated to a node includes a cost accrued to the capital and operational costs of the infrastructure of the data centre based upon the utilised portion of capacity.

11. The system of claim 1, wherein the cost allocated to a node includes a cost accrued to the power lost in variable losses in the data centre infrastructure due to the power delivered to the device represented by the node.

12. The system of claim 1, wherein the applied load input for at least one of said nodes is an applied IT workload.

13. The system of claim 1, wherein at least one of the nodes is a device node which represents multiple devices of the same type and function operating as a group.

14. The system of claim 1, wherein said function for calculating the node outputs from the node inputs is selected from the group consisting of:
    functions using data points for loss or efficiency by one or more variables;
    parameterized functions for loss or efficiency by one or more variables;
    functions that simulate control systems for devices in the data center; and
    distribution or transformation functions.

15. The system of claim 1, wherein the nodes pass data using an extensible data format.

16. The system of claim 15, wherein the data passed between the nodes comprises a range of categories of cost.

17. The system of claim 15, wherein the data passed between the nodes comprises power passed as a vector representing power factor harmonics.

18. The system of claim 15, wherein the data passed between the nodes comprises values for absolute or relative humidity, water mass or water mass rate.

\* \* \* \* \*